United States Patent
Imamura et al.

(10) Patent No.: US 7,852,814 B2
(45) Date of Patent: Dec. 14, 2010

(54) TRANSMISSION CONTROL FRAME GENERATION DEVICE AND TRANSMISSION CONTROL DEVICE

(75) Inventors: Daichi Imamura, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 942 days.

(21) Appl. No.: 11/575,453

(22) PCT Filed: Sep. 15, 2005

(86) PCT No.: PCT/JP2005/017056

§ 371 (c)(1),
(2), (4) Date: Mar. 16, 2007

(87) PCT Pub. No.: WO2006/030867

PCT Pub. Date: Mar. 23, 2006

(65) Prior Publication Data

US 2008/0056181 A1    Mar. 6, 2008

(30) Foreign Application Priority Data

Sep. 17, 2004    (JP) ............................... 2004-272386

(51) Int. Cl.
*H04W 4/00* (2009.01)
*H04B 7/216* (2006.01)
*H04W 72/00* (2009.01)

(52) U.S. Cl. .................. 370/335; 370/329; 455/450

(58) Field of Classification Search ...... 455/450–452.5; 370/329, 335, 341–345

See application file for complete search history.

(56) References Cited

U.S. PATENT DOCUMENTS

| | | | |
|---|---|---|---|
| 2001/0024427 A1 | 9/2001 | Suzuki | |
| 2005/0120097 A1* | 6/2005 | Walton et al. | ............... 709/220 |

FOREIGN PATENT DOCUMENTS

| | | |
|---|---|---|
| JP | 2001156738 | 6/2001 |
| JP | 2001238269 | 8/2001 |
| JP | 2001351971 | 12/2001 |
| JP | 2003152671 | 5/2003 |
| JP | 2003169036 | 6/2003 |

OTHER PUBLICATIONS

PCT International Search Report dated Dec. 20, 2005.
B. Classon, et al.; "Multi-dimensional Adaptation and Multi-user Scheduling Techniques for Wireless OFDM Systems", IEEE International Conference on Communications 2003 (ICC2003), vol. 3, pp. 2251-2255, May 11-15, 2003.

* cited by examiner

*Primary Examiner*—Michael T Thier
(74) *Attorney, Agent, or Firm*—Dickinson Wright PLLC

(57) ABSTRACT

There is provided a transmission control frame generation device capable of reducing the data amount of feedback information while maintaining a high throughput. In this device, an average quality level calculation unit (182) calculates an average SNR value of a plurality of sub-carriers from a plurality of SNR values corresponding to the plurality of sub-carriers. According to an SNR value corresponding to one of the sub-carriers and the average SNR value, a sub-carrier block configuration unit (185) sets the SNR value of the sub-carrier block containing the sub-carrier. A feedback frame generation unit (187) generates a CSI frame used for controlling transmission in the sub-carrier and indicating the value representing the average SNR value and the value representing the SNR value of the sub-carrier block.

23 Claims, 26 Drawing Sheets

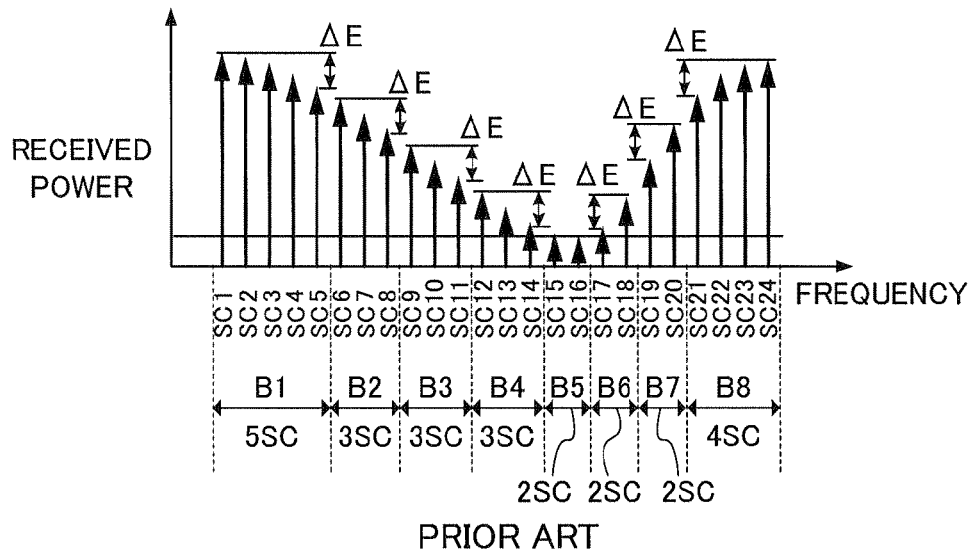
FIG.2A PRIOR ART
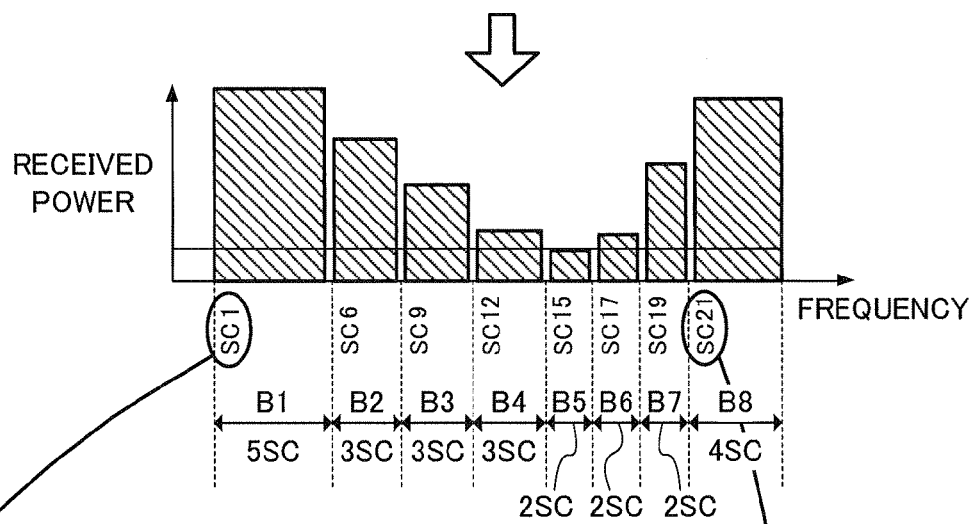
FIG.2B PRIOR ART
FIG.2C PRIOR ART

| ΔSNR | BLOCK SIZE |
|---|---|
| 5 < ΔSNR | 6 |
| 0 < ΔSNR ≦ 5 | 5 |
| −5 < ΔSNR ≦ 0 | 4 |
| −10 < ΔSNR ≦ −5 | 3 |
| −15 < ΔSNR ≦ −10 | 2 |
| ΔSNR ≦ −15 | 1 |
| SUCARRIER SNR < MINIMUM RECEIVED SNR | 1 (OR, MARK EXPRESSING MINIMUM RECEIVED SNR + NUMBER OF SUBCARRIERS) |

| SUBCARRIER NUMBER | ΔSNR [dB] |
|---|---|
| SC0 | −2.5 |
| SC1 | −1.5 |
| SC2 | −0.5 |
| SC3 | 0.5 |
| SC4 | 1.5 |
| SC5 | 2.0 |
| SC6 | 3.0 |
| SC7 | 3.5 |
| SC8 | 4.0 |
| SC9 | 4.5 |
| SC10 | 5.0 |
| SC11 | 4.0 |
| SC12 | 2.5 |
| SC13 | 1.5 |
| SC14 | −0.5 |
| SC15 | −3.0 |
| SC16 | −7.5 |
| SC17 | −15.0 |
| SC18 | −17.0 |
| SC19 | −16.5 |
| SC20 | −10.5 |
| SC21 | −9.5 |
| SC22 | −6.0 |
| SC23 | −3.0 |

FIG.10

| BLOCK NUMBER | BLOCK SIZE | ΔSNR$_{BLK}$ [dB] |
|---|---|---|
| B1 | 4 | −1 |
| B2 | 5 | 2.8 |
| B3 | 5 | 3.5 |
| B4 | 3 | ~~3.7~~ ⇒ −5.0 |
| B5 | 1 | −15 |
| B6 | 1 | −17 |
| B7 | 1 | −16.5 |
| B8 | 2 | −10 |
| B9 | 2 | −4.5 |

FIG.11

| AVERAGE SNR VALUE | BLOCK#1 $\Delta SNR_{BLK}$ | BLOCK#2 $\Delta SNR_{BLK}$ | BLOCK#3 $\Delta SNR_{BLK}$ | · · · | BLOCK#N $\Delta SNR_{BLK}$ |
|---|---|---|---|---|---|

| AVERAGE SNR VALUE | BLOCK#1 SNR VALUE | BLOCK#2 SNR VALUE | BLOCK#3 SNR VALUE | · · · | BLOCK#N SNR VALUE |
|---|---|---|---|---|---|

| AVERAGE SNR VALUE | BLOCK#1 ΔSNR$_{BLK}$ | BLOCK#2 ΔSNR$_{BLK}$ | BLOCK#3 ΔSNR$_{BLK}$ | BLOCK#4 ΔSNR$_{BLK}$ | BLOCK#5 ΔSNR$_{BLK}$ | BLOCK#6 ΔSNR$_{BLK}$ | BLOCK#7 ΔSNR$_{BLK}$ | BLOCK#8 ΔSNR$_{BLK}$ | BLOCK#9 ΔSNR$_{BLK}$ |
|---|---|---|---|---|---|---|---|---|---|
| $\bar{\gamma}_k$ | -1 dB | 2.8 dB | 3.5 dB | -5.0 dB | -15 dB | -17 dB | -16.5 dB | -10 dB | -4.5 dB |

| BLOCK#1 SIZE | BLOCK#2 SIZE | BLOCK#3 SIZE | BLOCK#4 SIZE | BLOCK#5 SIZE | BLOCK#6 SIZE | BLOCK#7 SIZE | BLOCK#8 SIZE | BLOCK#9 SIZE |
|---|---|---|---|---|---|---|---|---|
| 4 | 5 | 5 | 3 | 1 | 1 | 1 | 2 | 2 |

| NUMBER OF LEVEL CROSSOVERS ($N_L$) | DELAY SPREAD ESTIMATION VALUE |
|---|---|
| $4 < N_L$ | 3 |
| $2 < N_L \leq 4$ | 2 |
| $N_L \leq 2$ | 1 |

FIG.24

| DELAY SPREAD ESTIMATION VALUE | LOOK-UP TABLE SETTING |
|---|---|
| 3 | SETTING A |
| 2 | SETTING B |
| 1 | SETTING C |

| ΔSNR | BLOCK SIZE |
|---|---|
| 5 < ΔSNR | 4 |
| 0 < ΔSNR ≦ 5 | 3 |
| −5 < ΔSNR ≦ 0 | 2 |
| −10 < ΔSNR ≦ −5 | 1 |
| −15 < ΔSNR ≦ −10 | 1 |
| ΔSNR ≦ −15 | 1 |
| SUBCARRIER SNR < MINIMUM RECEIVED SNR | 1 (OR, MARK EXPRESSING MINIMUM RECEIVED SNR + NUMBER OF SUBCARRIERS) |

FIG.27

| ΔSNR | BLOCK SIZE |
|---|---|
| 5 < ΔSNR | 6 |
| 0 < ΔSNR ≦ 5 | 5 |
| −5 < ΔSNR ≦ 0 | 4 |
| −10 < ΔSNR ≦ −5 | 3 |
| −15 < ΔSNR ≦ −10 | 2 |
| ΔSNR ≦ −15 | 1 |
| SUBCARRIER SNR < MINIMUM RECEIVED SNR | 1 (OR, MARK EXPRESSING MINIMUM RECEIVED SNR + NUMBER OF SUBCARRIERS) |

FIG.28

| ΔSNR | BLOCK SIZE |
|---|---|
| 5 < ΔSNR | 16 |
| 0 < ΔSNR ≦ 5 | 12 |
| −5 < ΔSNR ≦ 0 | 8 |
| −10 < ΔSNR ≦ −5 | 6 |
| −15 < ΔSNR ≦ −10 | 4 |
| ΔSNR ≦ −15 | 2 |
| SUBCARRIER SNR < MINIMUM RECEIVED SNR | 1 (OR, MARK EXPRESSING MINIMUM RECEIVED SNR + NUMBER OF SUBCARRIERS) |

| ΔSNR | BLOCK SIZE |
|---|---|
| 5 < ΔSNR | max (1, floor (6 × (DELAY SPREAD ESTIMATION VALUE))) |
| 0 < ΔSNR ≦ 5 | max (1, floor (5 × (DELAY SPREAD ESTIMATION VALUE))) |
| −5 < ΔSNR ≦ 0 | max (1, floor (4 × (DELAY SPREAD ESTIMATION VALUE))) |
| −10 < ΔSNR ≦ −5 | max (1, floor (3 × (DELAY SPREAD ESTIMATION VALUE))) |
| −15 < ΔSNR ≦ −10 | max (1, floor (2 × (DELAY SPREAD ESTIMATION VALUE))) |
| ΔSNR ≦ −15 | max (1, floor (1 × (DELAY SPREAD ESTIMATION VALUE))) |
| SUBCARRIER SNR < MINIMUM RECEIVED SNR | 1 (OR, MARK EXPRESSING MINIMUM RECEIVED SNR + NUMBER OF SUBCARRIERS) |

FIG.29

| DELAY SPREAD ESTIMATION VALUE | AVERAGE SNR VALUE | BLOCK #1 ΔSNR$_{BLK}$ | BLOCK #2 ΔSNR$_{BLK}$ | BLOCK #3 ΔSNR$_{BLK}$ | ... | BLOCK #N ΔSNR$_{BLK}$ |
|---|---|---|---|---|---|---|

FIG.30

| DELAY SPREAD ESTIMATION VALUE | AVERAGE SNR VALUE | BLOCK #1 SNR VALUE | BLOCK #2 SNR VALUE | BLOCK #3 SNR VALUE | ... | BLOCK #N SNR VALUE |
|---|---|---|---|---|---|---|

FIG.31

| MCS PARAMETER | BLOCK SIZE | ΔSNR |
|---|---|---|
| 64QAM, (R=7/8) | | |
| 64QAM, (R=3/4) | | |
| 16QAM, (R=3/4) | 6 | g < ΔSNR |
| 16QAM, (R=1/2) | 5 | THRESHOLD VALUE e < ΔSNR ≦ THRESHOLD VALUE f |
| QPSK, (R=3/4) | 4 | THRESHOLD VALUE c < ΔSNR ≦ THRESHOLD VALUE d |
| QPSK, (R=1/2) | 3 | THRESHOLD VALUE b < ΔSNR ≦ THRESHOLD VALUE c |
| BPSK, (R=3/4) | 2 | THRESHOLD VALUE a < ΔSNR ≦ THRESHOLD VALUE b |
| BPSK, (R=1/2) | 1 | ΔSNR ≦ THRESHOLD VALUE a |
| BPSK, (R=1/3) | | |
| RECEPTION NOT POSSIBLE | | |

AVERAGE SNR VALUE ⇒

FIG.34

| SNR | MCS PARAMETER |
|---|---|
| 24 < SNR | 64QAM, (R=7/8) |
| 21 < SNR ≦ 24 | 64QAM, (R=3/4) |
| 18 < ΔSNR ≦ 21 | 16QAM, (R=3/4) |
| 15 < ΔSNR ≦ 18 | 16QAM, (R=1/2) |
| 12 < ΔSNR ≦ 15 | QPSK, (R=3/4) |
| 9 < ΔSNR ≦ 12 | QPSK, (R=1/2) |
| 6 < ΔSNR ≦ 9 | BPSK, (R=3/4) |
| 3 < ΔSNR ≦ 6 | BPSK, (R=1/2) |
| 0 < ΔSNR ≦ 3 | BPSK, (R=1/3) |
| RECEPTION NOT POSSIBLE | RECEPTION NOT POSSIBLE |

FIG.35

| BLOCK SIZE | ΔSNR |
|---|---|
| 6 | 4 < ΔSNR |
| 5 | 1 < ΔSNR ≦ 4 |
| 4 | -2 < ΔSNR ≦ 1 |
| 3 | -5 < ΔSNR ≦ -2 |
| 2 | -8 < ΔSNR ≦ -5 |
| 1 | ΔSNR ≦ -8 |

FIG.36

| MCS PARAMETER | BLOCK SIZE |
|---|---|
| 64QAM, (R=7/8) | 6 |
| 64QAM, (R=3/4) | |
| 16QAM, (R=3/4) | |
| 16QAM, (R=1/2) | |
| QPSK, (R=3/4) | 6 |
| QPSK, (R=1/2) | 5 |
| BPSK, (R=3/4) | 4 |
| BPSK, (R=1/2) | 3 |
| BPSK, (R=1/3) | 2 |
| | 1 |
| RECEPTION NOT POSSIBLE | |

AVERAGE SNR VALUE⇒

FIG.37

| MCS PARAMETER | BLOCK SIZE |
|---|---|
| 64QAM, (R=7/8) | 6 |
| 64QAM, (R=3/4) | 5 |
| 16QAM, (R=3/4) | 4 |
| 16QAM, (R=1/2) | 3 |
| QPSK, (R=3/4) | 2 |
| QPSK, (R=1/2) | 1 |
| BPSK, (R=3/4) | 1 |
| BPSK, (R=1/2) | |
| BPSK, (R=1/3) | |
| RECEPTION NOT POSSIBLE | |

AVERAGE SNR VALUE⇒

FIG.38

| MCS VALUE FOR AVERAGE SNR | BLOCK #1 MCS VALUE | BLOCK #2 MCS VALUE | BLOCK #3 MCS VALUE | ... | BLOCK #N MCS VALUE |
|---|---|---|---|---|---|

FIG.39

TRANSMISSION CONTROL FRAME GENERATION DEVICE AND TRANSMISSION CONTROL DEVICE

TECHNICAL FIELD

The present invention relates to a transmission control frame generation apparatus and a transmission control apparatus used in a mobile communication system of a multicarrier transmission scheme.

BACKGROUND ART

In the next generation mobile communication system such as the fourth generation system, a data rate exceeding 100 Mbps is required even upon high mobility. In order to satisfy this requirement, various wireless communication using a bandwidth of approximately 100 MHz has been studied. Of these, in particular, multicarrier transmission schemes represented by an OFDM (Orthogonal Frequency Division Multiplexing) scheme have been considered as important as transmission schemes for the next generation mobile communication system from the point of view of adaptability to a frequency selective fading environment and spectrum efficiency.

As one technique studied in order to realize high data throughput in the mobile communication system of the multicarrier transmission scheme, there is adaptive transmission control. In adaptive transmission control, a channel state is estimated for each subcarrier or each segment, and modulation parameters such as error correction performance, M-ary number, power, phase and transmission antenna are adaptively controlled for each subcarrier or each segment based on channel state information (CSI) indicating the result of this estimation. A segment is one part of the entire band used in multicarrier transmission and includes one or more subcarriers. The configuration and operation for controlling the modulation parameters for each segment are basically the same as the configuration and operation for controlling the modulation parameters for each subcarrier. To simplify the description, only modulation parameter control for each subcarrier will be described in the following description. Modulation parameter control for each segment is implemented by appropriately substituting "segment" for "subcarrier".

There is a closed loop type in adaptive transmission control. Namely, an apparatus that receives information transmitted using subcarriers which are control targets feeds back CSI of these subcarriers. On the other hand, an apparatus that transmits information using subcarriers which are control targets, receives the feed back information, and adaptively controls the modulation parameters for the subcarriers based on this information.

In an example of adaptive transmission control of the related art, as shown in FIG. 1A, received power is individually measured for a plurality of subcarriers, and, as shown in FIG. 1B, a fixed number (in the same drawing, two) of neighboring subcarriers (in other words, subcarriers having the consecutive numbers assigned as identification information) are handled as a single subcarrier block. As shown in FIG. 1C, CSI obtained on a subcarrier block basis is then fed back to a transmitting side (for example, refer to non-patent document 1). The subcarrier block (or simply referred to as "block") is one or more subcarriers gathered together, and more specifically, is defined as a group formed with one subcarrier or a neighboring plurality of subcarriers.

Further, in another example of adaptive transmission control of the related art, as shown in FIG. 2A, neighboring subcarriers where received power difference falls within a specific value (for example, ΔE) are handled as a single subcarrier block, and, as shown in FIG. 2B, CSI is calculated on the subcarrier block basis. Then, as shown in FIG. 2C, identification information for a head (or tail) subcarrier included in a given subcarrier block and CSI calculated for this subcarrier block are combined and fed back (for example, refer to patent document 1 and patent document 2).

Patent Document 1: Japanese Patent Application Laid-Open No. 2001-351971.

Patent Document 2: Japanese Patent Application Laid-open No. 2001-366285.

Non-patent document 1: "Multi-dimensional Adaptation and Multi-user Scheduling Techniques for Wireless OFDM Systems", Brian Classon, Philippe Sartori, Vijay Nangia, Xiangyang Zhuang, Kevin Baum, IEEE International Conference on Communications 2003 (ICC2003), vol. 3, pp. 2251-2255, 11-15 May 2003

DISCLOSURE OF INVENTION

Problems to be Solved by the Invention

However, in adaptive transmission control of the closed loop type, the amount of data (number of bits) of feed back information becomes larger in accordance with an increase of the number of subcarriers used in the multicarrier transmission, and overhead of the feedback information also increases.

For example, in an example described using FIGS. 1A to 1C, in order to maintain high data throughput, it is necessary to reduce the number of subcarriers (hereinafter referred to as "block size") constituting the subcarrier block and increase the number of subcarrier blocks. As a result, the CSI to be fed back increases, and the amount of data for the feedback information also increases.

Further, in the example described using FIGS. 2A to 2C, variable setting of the subcarrier blocks is possible. Therefore, when the block size is set to be large, compared to the case of setting the block size to be small, the amount of data for the feedback information is reduced, but it is necessary to feed back subcarrier identification information included in the subcarrier block in addition to the CSI of the subcarrier block. Namely, it is necessary to feed back the same number of identification information as the number of the subcarriers in addition to the same number of CSI as the number of the subcarriers, and therefore the amount of data for the feedback information increases.

It is therefore an object of the present invention to provide a transmission control frame generating apparatus and a transmission control apparatus capable of maintaining high data throughput and reducing the amount of data for feedback information.

Means for Solving the Problem

A transmission control frame generating apparatus of the present invention adopts a configuration having: a calculating section that calculates a reference channel state level between a plurality of subcarriers from a plurality of subcarrier channel state levels respectively corresponding to the plurality of subcarriers; a setting section that sets a group channel state level of a group including the subcarriers based on a subcarrier channel state level corresponding to any of the plurality of subcarriers and the reference channel state level; and a generating section that generates a frame that is used in control of transmission using the subcarriers and indicates a first value expressing the calculated reference channel state level and a second value expressing the set group channel state level.

A transmission control apparatus of the present invention adopts a configuration having: an extraction section that extracts a first value and a second value respectively indicated in a frame, the first value expressing a reference channel state level between a plurality of subcarriers, and the second value expressing a group channel state level of a group including any of the plurality of subcarriers; a generating section that generates a subcarrier channel state level of the subcarriers included in the group based on the reference channel state level and the group channel state level of the group; and a control section that controls transmission using the subcarriers based on the generated subcarrier channel state level.

A transmission control frame generating method of the present invention has: a calculating step of calculating a reference channel state level between a plurality of subcarriers from a plurality of subcarrier channel state levels respectively corresponding to the plurality of subcarriers; a setting step of setting a group channel state level of a group including the subcarriers based on a subcarrier channel state level corresponding to any of the plurality of subcarriers and the reference channel state level; and a generating step of generating a frame that is used in control of transmission using the subcarriers and indicates a first value expressing the calculated reference channel state level and a second value expressing the set group channel state level.

A transmission control method of the present invention has: an extraction step of extracting a first value and a second value respectively indicated in a frame, the first value expressing a reference channel state level between a plurality of subcarriers, and the second value expressing a group channel state level of a group including any of the plurality of subcarriers; a generating step of generating a subcarrier channel state level of the subcarriers included in the group based on the reference channel state level and the group channel state level of the group; and a control step of controlling transmission using the subcarriers based on the generated subcarrier channel state level.

Advantageous Effect of the Invention

According to the present invention, it is possible to maintain high data throughput and reduce the amount of data for feedback information.

BRIEF DESCRIPTION OF THE DRAWINGS

FIG. 2 shows another example of adaptive transmission control of the related art;

FIG. 10 shows an example of a differential SNR value for each subcarrier according to Embodiment 1 of the present invention;

FIG. 11 shows an example of setting results of the subcarrier blocks according to Embodiment 1 of the present invention;

FIG. 24 shows a table for acquiring a delay spread estimation value according to Embodiment 2 of the present invention;

FIG. 25 illustrates switching of setting content of the look-up table according to Embodiment 2 of the present invention;

FIG. 26 shows a first look-up table according to Embodiment 2 of the present invention;

FIG. 27 shows a second look-up table according to Embodiment 2 of the present invention;

FIG. 28 shows a third look-up table according to Embodiment 2 of the present invention;

FIG. 29 shows a modified example of the look-up table according to Embodiment 2 of the present invention;

FIG. 30 shows a frame format of a CSI frame according to Embodiment 2 of the present invention;

FIG. 31 shows a modified example of the frame format of the CSI frame according to Embodiment 2 of the present invention;

FIG. 34 shows correlation between the look-up table and MCS values according to Embodiment 3 of the present invention;

FIG. 35 shows a table for deciding MCS values according to Embodiment 3 of the present invention;

FIG. 36 shows a look-up table within a reception apparatus according to Embodiment 3 of the present invention;

FIG. 37 shows an example of a correspondence relationship between MCS parameters and block sizes according to Embodiment 3 of the present invention;

FIG. 38 shows another example of a correspondence relationship between MCS parameters and block sizes according to Embodiment 3 of the present invention;

FIG. 39 shows a frame format of the CSI frame according to Embodiment 3 of the present invention.

BEST MODE FOR CARRYING OUT THE INVENTION

Embodiments of the present invention will be described in detail below with reference to the accompanying drawings.

Embodiment 1

Figure 1A:
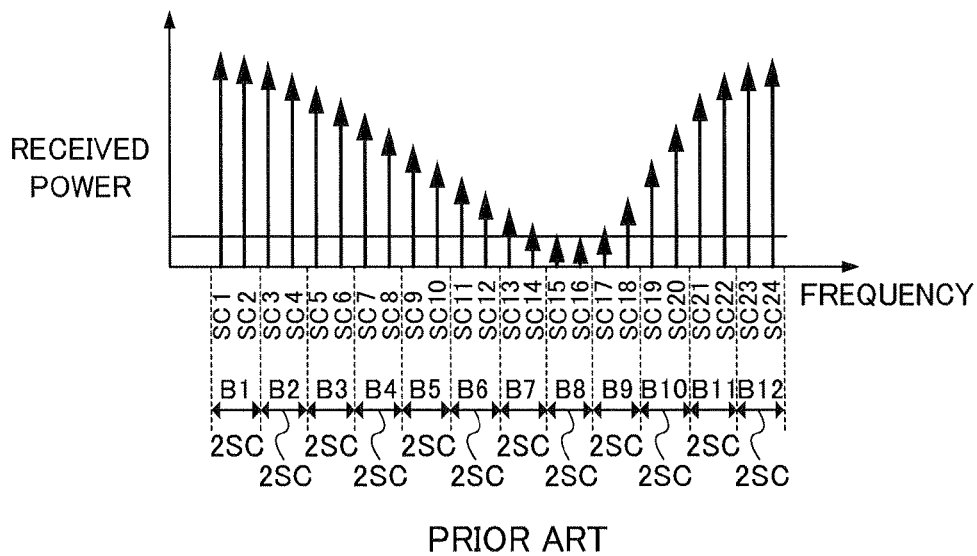
FIG. 1 shows an example of adaptive transmission control of the related art.
Figure 1B:
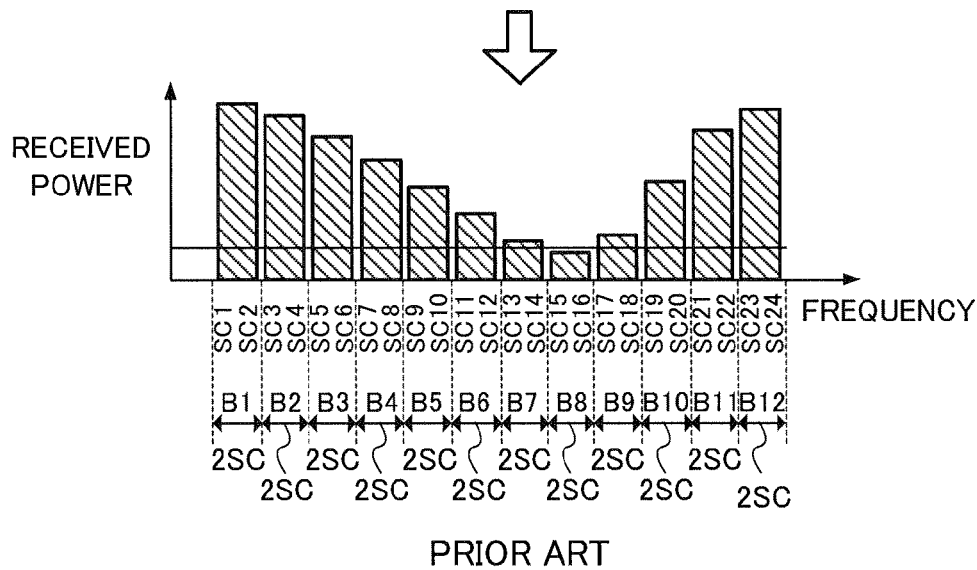
Figure 1C:
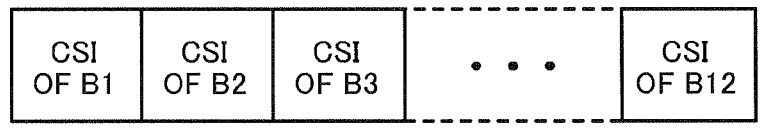
Figure 3:
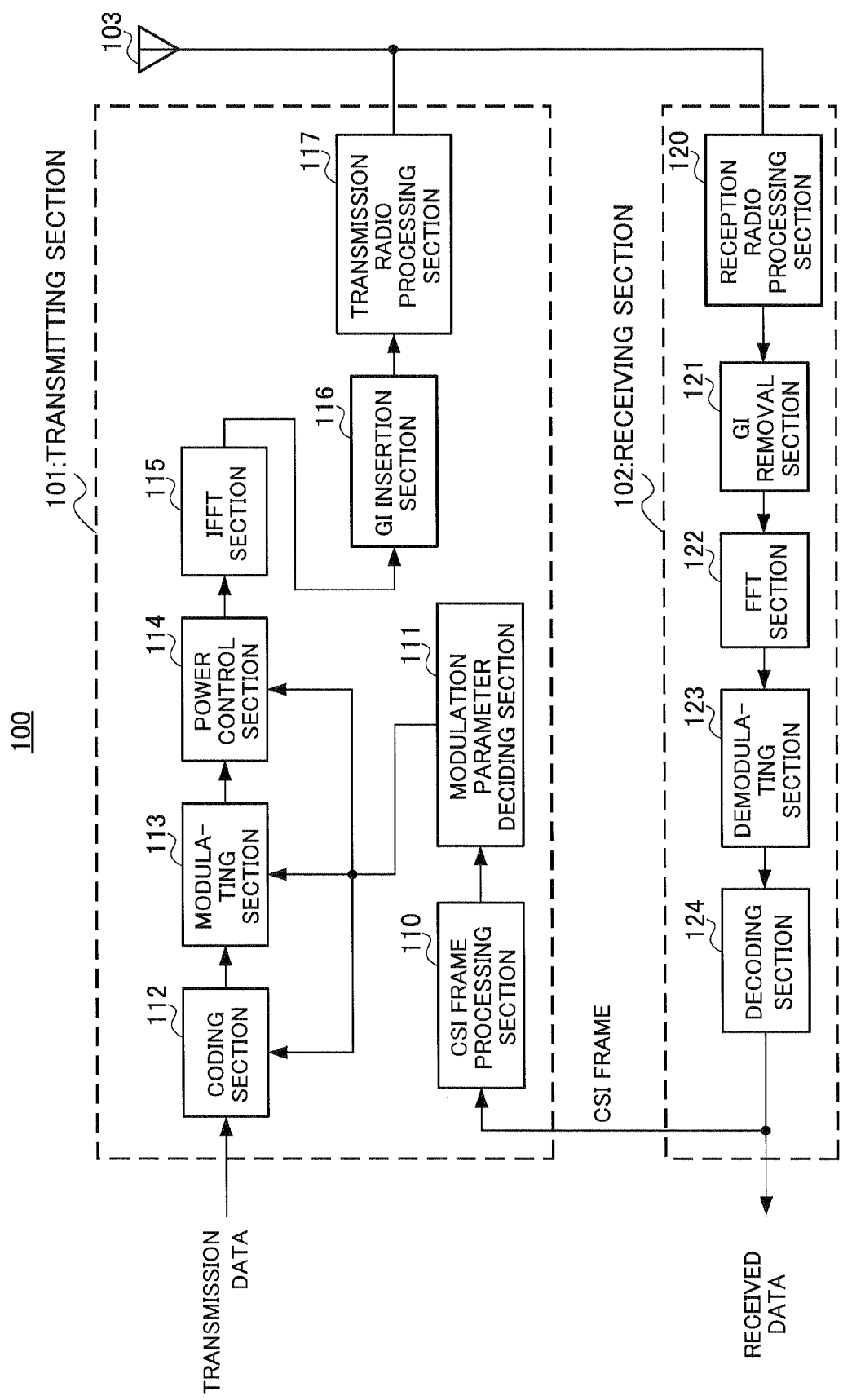
FIG. 3 is a block diagram showing a configuration of a transmission apparatus according to Embodiment 1 of the present invention.
Figure 4:
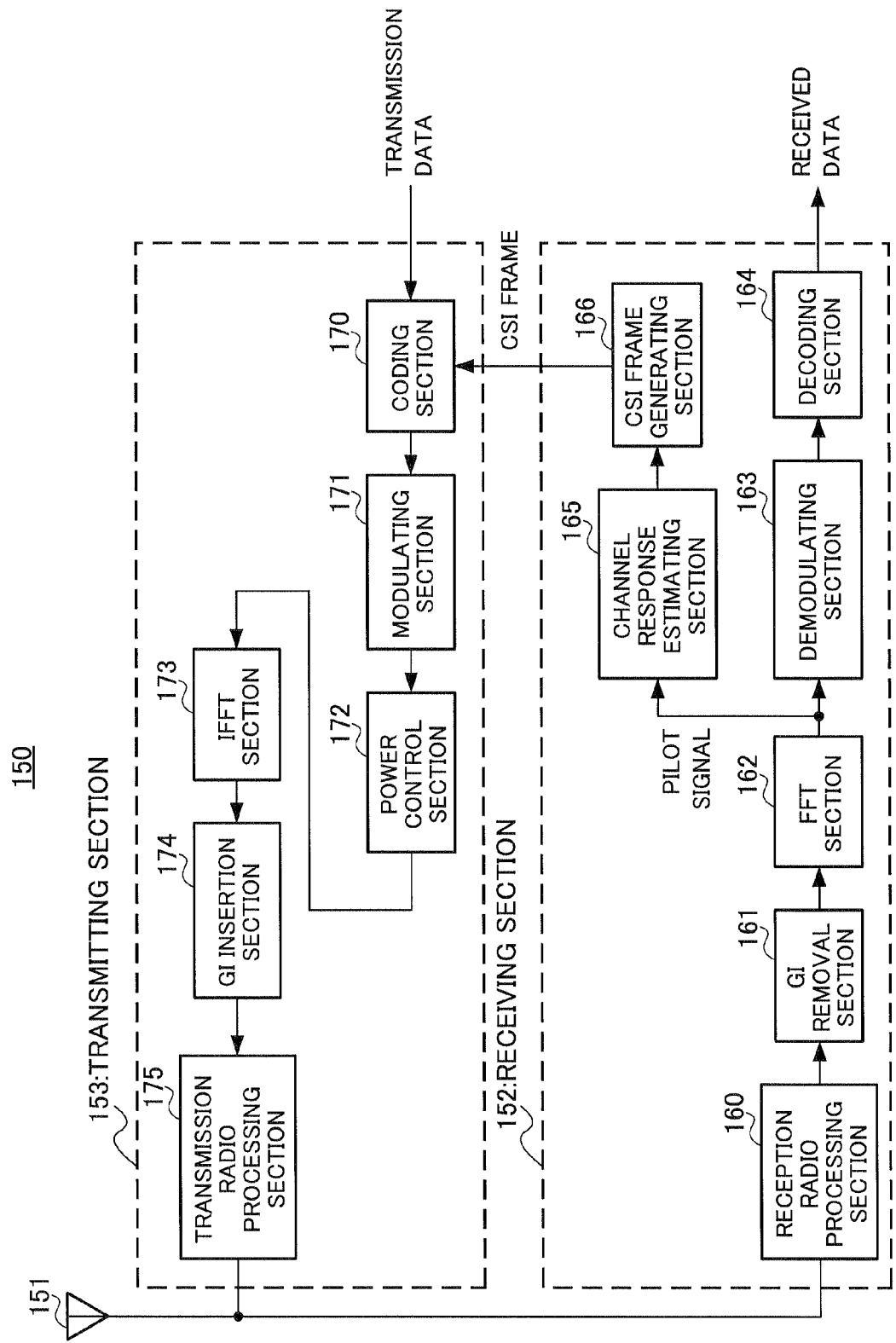
FIG. 4 is a block diagram showing a configuration of a reception apparatus according to Embodiment 1 of the present invention.

FIG. 3 is a block diagram showing a configuration of the wireless communication apparatus applying the transmission control apparatus according to Embodiment 1 of the present invention. Further, FIG. 4 is a block diagram showing a configuration of the wireless communication apparatus applying the transmission control frame generating apparatus according to Embodiment 1 of the present invention. The wireless communication apparatus applying the transmission control apparatus is an apparatus for transmitting information (information data sequence) using subcarriers of control targets, and therefore referred to as "transmission apparatus" in the following description. On the other hand, the wireless communication apparatus applying the transmission control frame is an apparatus for receiving information (information data sequence) transmitted using subcarriers of control targets, and therefore referred to as "reception apparatus" in the following description. Transmission apparatus 100 of FIG. 3 and reception apparatus 150 of FIG. 4 are provided on a base station apparatus, a communication terminal apparatus and the like used in a mobile communication system.

Transmission apparatus 100 has transmitting section 101, receiving section 102 and antenna 103. Transmitting section 101 has CSI frame processing section 110, modulation parameter deciding section 111, coding section 112, modulating section 113, power control section 114, IFFT (Inverse Fast Fourier Transform) section 115, GI (Guard Interval) insertion section 116 and transmission radio processing section 117. Receiving section 102 has reception radio processing section 120, GI removal section 121, FFT (Fast Fourier Transform) section 122, demodulating section 123 and decoding section 124.

CSI frame processing section 110 acquires channel state information (hereinafter referred to as "CSI") for each subcarrier from the CSI frame obtained through decoding processing by decoding section 124. The configuration and operation of the CSI frame processing section 110 will be described in detail later.

Modulation parameter deciding section 111 as a control section decides modulation parameters (forward error correction code, coding rate, modulation scheme and transmission power) for each subcarrier based on the CSI of each subcarrier inputted from CSI frame processing section 110. Namely, transmission using each subcarrier is controlled using the decided forward error correction code, coding rate, modulation scheme and transmission power. The combination of CSI frame processing section 110 and modulation parameter deciding section 111 configures a transmission control apparatus.

Coding section 112 codes inputted time-series transmission data for each subcarrier using the forward error correction coding scheme and coding rate indicated by modulation parameter deciding section 111. Modulating section 113 modulates the coded transmission data for each subcarrier using the modulation scheme (for example, M-PSK and M-QAM) indicated by modulation parameter deciding section 111. Power control section 114 sets transmission power for each subcarrier to the transmission power value indicated by modulation parameter deciding section 111. IFFT section 115 carries out IFFT processing for multiplexing signals modulated for each subcarrier with a plurality of orthogonal subcarriers, and generates OFDM symbols that are multicarrier signals. GI insertion section 116 inserts GIs between the OFDM symbols in order to reduce inter symbol interference (ISI) due to a delay wave.

Transmission radio processing section 117 as the transmitting section carries out predetermined radio frequency processing such as up-conversion on the OFDM symbols and transmits the OFDM symbols after the radio frequency processing from antenna 103 to reception apparatus 150. Namely, transmission data sequence superimposed on each subcarrier is radio transmitted.

Reception radio processing section 120 as a receiving section carries out predetermined radio frequency processing such as down-conversion on the OFDM symbols received at antenna 103. The received OFDM symbols include CSI put into the form of frames (CSI frames). Namely, reception radio processing section 120 receives CSI frames.

GI removal section 121 removes the GIs inserted between the OFDM symbols. FFT section 122 carries out FFT processing on the OFDM symbols after GI removal, and acquires signals for each subcarrier. Demodulating section 123 demodulates signals after FFT, and decoding section 124 decodes signals after demodulation. As a result, the received data can be obtained. The received data includes data frames and CSI frames.

Reception apparatus 150 of FIG. 4 has antenna 151, receiving section 152 and transmitting section 153. Receiving section 152 has reception radio processing section 160, GI removal section 161, FFT section 162, demodulating section 163, decoding section 164, channel response estimating section 165 and CSI frame generating section 166. Transmitting section 153 has coding section 170, modulating section 171, power control section 172, IFFT section 173, GI insertion section 174 and transmission radio processing section 175.

Reception radio processing section 160 as a receiving section carries out predetermined radio frequency processing such as down-conversion on the OFDM symbols received at antenna 151. Namely, reception radio processing section 160 receives the data sequence superimposed on each subcarrier.

GI removal section 161 removes the GIs inserted between the OFDM symbols. FFT section 162 carries out FFT processing on OFDM symbols after GI removal, and acquires signals for each subcarrier. Demodulating section 163 receives information signals where pilot signals or the like have been eliminated, out of the signals after FFT. Demodulating section 163 demodulates the information signals using a demodulation scheme corresponding to the modulation scheme used in modulation at transmission apparatus 100. Decoding section 164 carries out decoding processing such as error correction on the signals after demodulation using a decoding scheme corresponding to the coding scheme used in coding at transmission apparatus 100 and acquires received data.

Channel response estimating section 165 receives signals required for estimating a channel response, such as pilot signals, out of the signals after FFT. Channel response estimating section 165 then estimates a channel response for each subcarrier, and obtains a channel response estimation value (channel estimation value).

CSI frame generating section 166 as a transmission control frame generation apparatus obtains CSI of each subcarrier based on the channel estimation value, and generates a CSI frame for feeding back the CSI to transmission apparatus 100. The configuration and operation of CSI frame generating section 166 will be described in detail later.

Coding section 170 encodes the inputted time-series transmission data and the CSI frame for each subcarrier using a predetermined coding scheme and coding rate. Modulating section 171 modulates the coded transmission data and CSI frame for each subcarrier using the predetermined modulation scheme. Power control section 172 controls transmission power for each subcarrier. IFFT section 173 carries out IFFT processing of multiplexing signals modulated for each subcarrier with a plurality of orthogonal subcarriers, and generates OFDM symbols that are multicarrier signals. GI insertion section 174 inserts GIs between the OFDM symbols in order to reduce the ISI due to the delay wave. Transmission radio processing section 175 as the transmitting section carries out predetermined radio frequency processing such as up-conversion on the OFDM symbols and transmits the OFDM symbols after the radio frequency processing from antenna 151 to transmission apparatus 100. Namely, transmission radio processing section 175 radio transmits the generated CSI frame.

Figure 5:
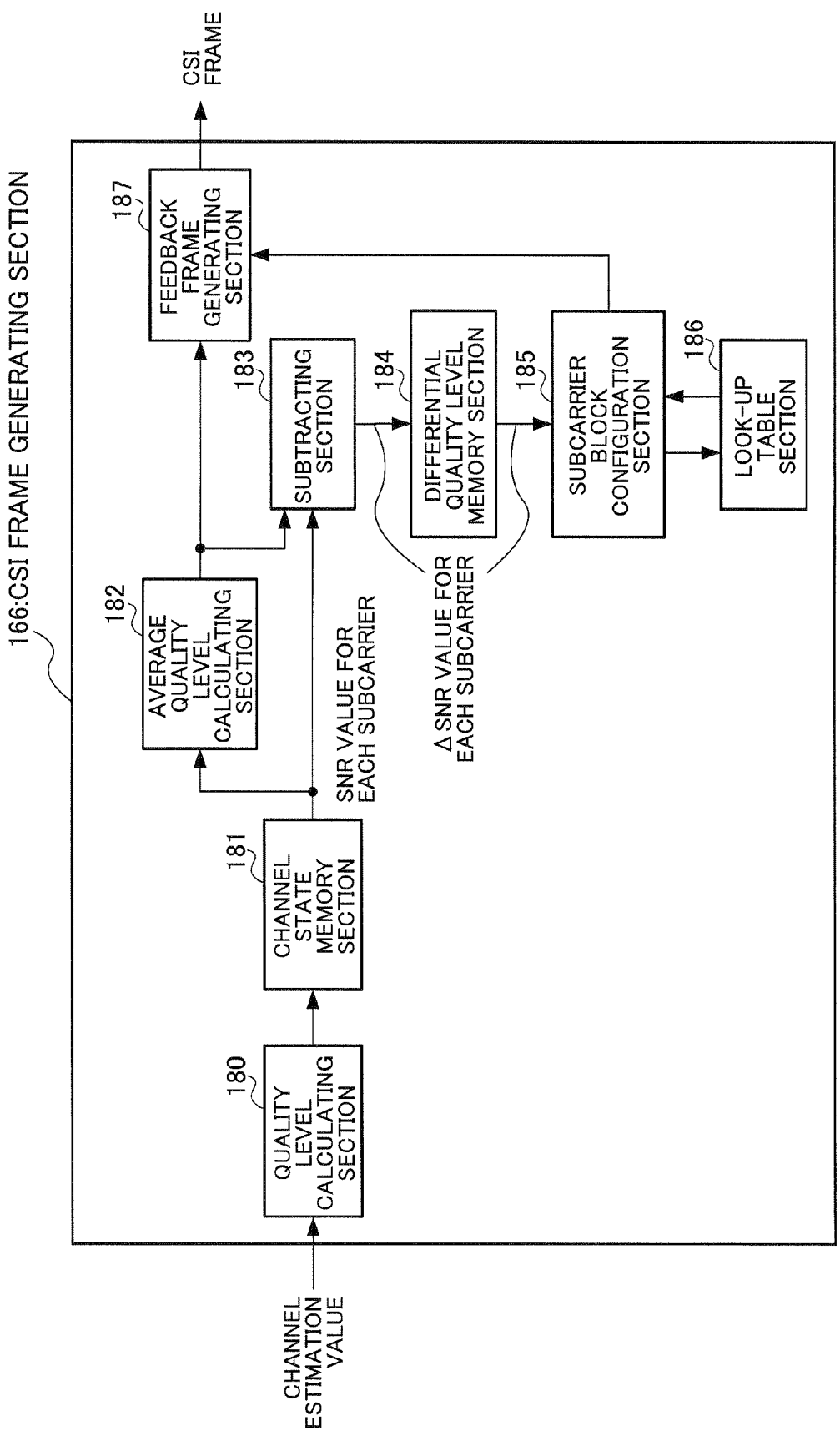
FIG. 5 is a block diagram showing a configuration of a CSI frame generating section according to Embodiment 1 of the present invention.

Next, the internal configuration and operation of CSI frame generating section 166 will be described. As shown in FIG. 5, CSI frame generating section 166 has quality level calculating section 180, channel state memory section 181, average quality level calculating section 182, subtracting section 183, differential quality level memory section 184, subcarrier block configuration section 185, look-up table section 186 and feedback frame generating section 187.

Quality level calculating section 180 calculates an SNR (Signal to Noise power Ratio) value for each subcarrier from the channel response estimation value (channel estimation value) for each subcarrier inputted from channel response estimating section 165 as a value indicating the channel state. The SNR value referred to in the following description is a logarithmic value, except for the case of referring to use of a true value. Further, the case is described where the SNR is used as a quality level (channel state level), but it is also possible to use a CNR (Carrier to Noise power Ratio), received power, received signal amplitude, RSSI (Received Signal Strength Indicator), reception strength, error rate, transmission rate, throughput or the like as a channel state level in place of the SNR. Further, in a communication system such as a cellular system, where not only noise power but also interference power is important as CSI, it is also possible to use interference power, the amount of interference, SIR (Signal to Interference power Ratio), CIR (Carrier to Interference power Ratio), SINR (Signal to Interference and Noisepower Ratio), CINR (Carrier to Interference and Noise power Ratio) or the like as a channel state level.

Channel state memory section 181 holds an SNR value for each subcarrier calculated by quality level calculating section 180.

Average quality level calculating section 182 as a calculating section calculates an average SNR value over all subcarriers using the SNR value for each subcarrier held in channel state memory section 181. In this embodiment, the calculated average SNR value is used as a reference quality level for all subcarriers, but it is also possible to use a median value in place of the average SNR value.

Subtracting section 183 subtracts the average SNR value from the SNR value for each subcarrier, and for the SNR value for each subcarrier, calculates a differential SNR value (hereinafter referred to as "$\Delta$SNR value") indicating the relative size with respect to the average SNR value.

Differential quality level memory section 184 holds a $\Delta$SNR value for each subcarrier calculated by subtracting section 183.

Subcarrier block configuration section 185 as a setting section collects one or more subcarriers into a subcarrier block, and sets an $\Delta$SNR value (hereinafter referred to as "$\Delta SNR_{BLK}$") for each subcarrier block. Further, the block size of each subcarrier block is set according to a value set in the look-up table held in look-up table section 186. Subcarrier block $\Delta SNR_{BLK}$ is then set so that the block size and $\Delta SNR_{BLK}$ for each block do not conflict with the look-up table.

Figures 6, 7:
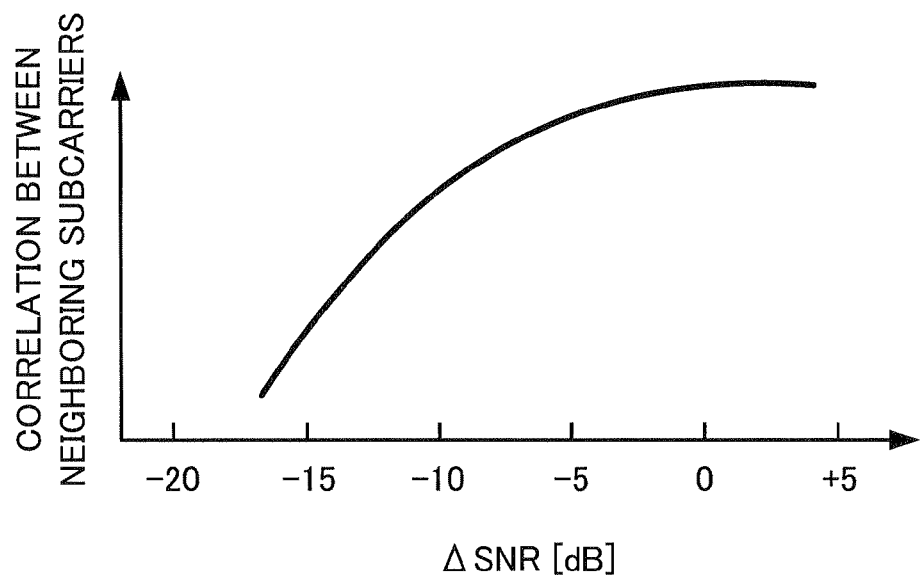
FIG. 6 is a block diagram showing a look-up table according to Embodiment 1 of the present invention.
FIG. 7 shows a statistical relationship between a differential SNR value of subcarriers and correlation between neighboring subcarriers.

Look-up table section 186 as the holding section holds in advance the look-up table as shown in FIG. 6, for example. When the $\Delta$SNR value for each subcarrier is inputted from subcarrier block configuration section 185, a block size corresponding to the inputted $\Delta$SNR value is outputted. Transmission apparatus 100 and reception apparatus 150 then share the look-up table having the same setting content.

In place of holding the table as shown in FIG. 6, look-up table section 186 may also calculate function f($\Delta$SNR) taking $\Delta$SNR which outputs a block size as an argument, as shown by the following equation:

$$\text{block size} = f(\Delta SNR)$$

Here, the look-up table has the following characteristic. Namely, when the $\Delta$SNR value is small (That is to say, $\Delta$SNR is around 0 [dB]), the block size is set to small, and when the $\Delta$SNR value is negative and large, the block size is set to large. This kind of setting is based on the statistical relationship between the $\Delta$SNR value of the subcarriers and correlation between neighboring subcarriers. This relationship is shown in FIG. 7. Namely, when the $\Delta$SNR value of a given subcarrier is small, the correlation between the neighboring subcarriers becomes small, and, when the $\Delta$SNR value of a given subcarrier is negative and large, the correlation between the neighboring subcarriers becomes large.

It is therefore possible to appropriately set a block size and $\Delta$SNR value for each block taking into consideration the relationship between the $\Delta$SNR value of each subcarrier and the correlation between the neighboring subcarriers, and reduce the errors (in this case, SNR errors) in CSI of each subcarrier occurring as a result of grouping the subcarriers.

Further, it is also possible to always suppress errors occurring as a result of grouping to a fixed level by setting a block size and $\Delta$SNR value for each subcarrier block according to the look-up table having a setting reflecting the relationship between the $\Delta$SNR value of each subcarrier and correlation between the neighboring subcarriers. Moreover, it is possible to share the look-up table between transmission and reception, and implement processing without conflict between transmission and reception.

Feedback frame generating section 187 generates a CSI frame using the average SNR value and ΔSNR value for each block set by subcarrier block configuration section 185. More specifically, the average SNR value is used as a value expressing a reference channel state level, and the ΔSNR value for each block is used as a value expressing the channel state level for each block.

Next, an example of the operation in CSI frame generating section 166 will be described.

Figure 8:
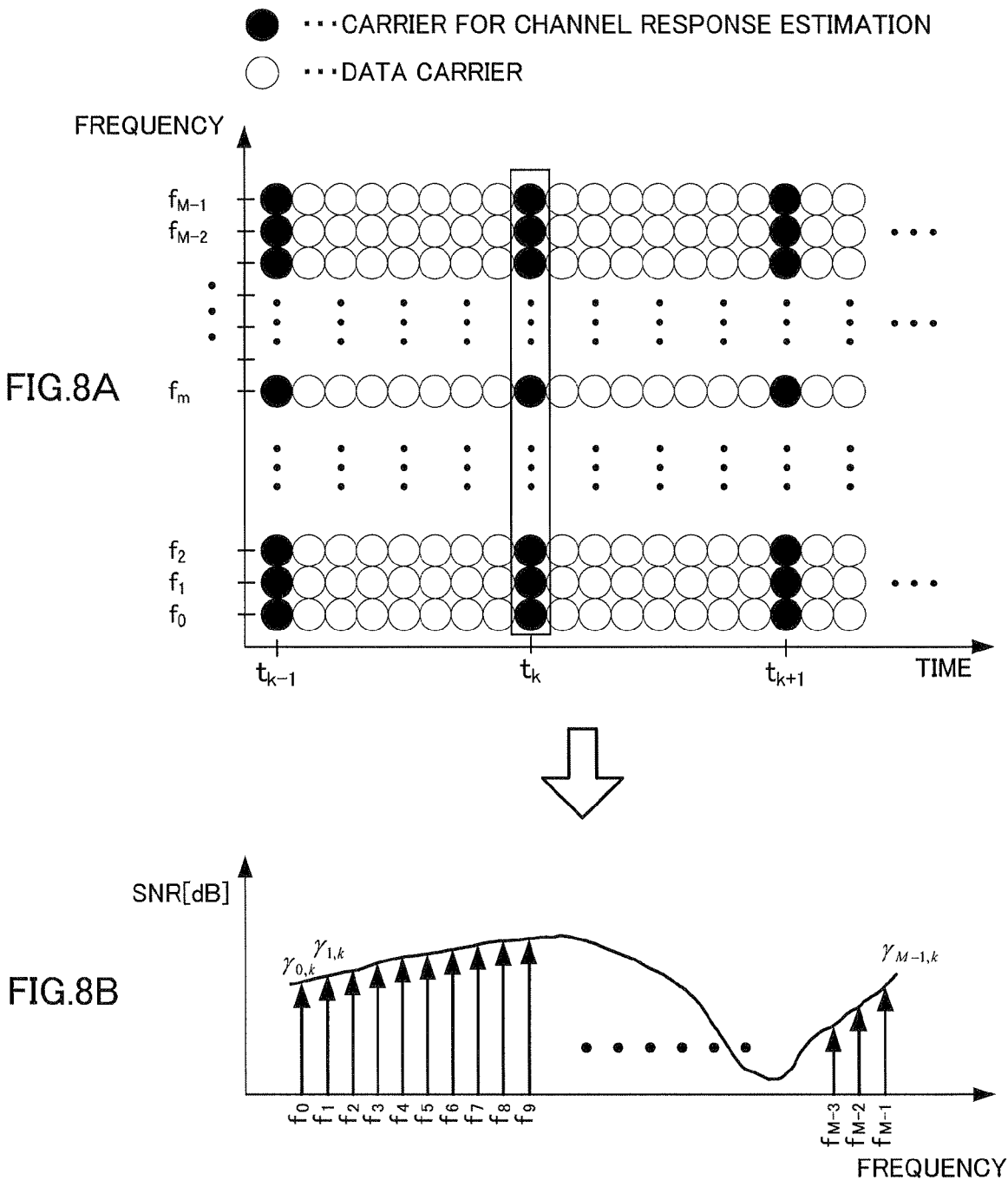
FIG. 8 shows an example of a configuration an OFDM frame, channel response estimation timing, and frequency response estimation value according to Embodiment 1 of the present invention.

FIGS. 8A and 8B show examples of the configuration of the OFDM frame exchanged between the transmitting and receiving stations, channel response estimation timing and frequency response estimation value. At the OFDM frame utilized between transmission apparatus 100 and reception apparatus 150, for example, as shown in FIG. 8A, a channel response estimation carrier (for example, known pilot signal) for estimating a frequency response of the channel is inserted at predetermined intervals between data carriers utilized for other purpose such as data. Channel response estimating section 165 estimates amplitude fluctuation and phase fluctuation incurred on the channel for each subcarrier at a timing of time $t_k$ (where k is an integer) using the channel response estimation carrier, and outputs these estimation results to quality level calculating section 180. In a system where blind estimation is carried out, a carrier for data may be used as a carrier for channel estimation.

Quality level calculating section 180 of CSI frame generating section 166 calculates SNR values $\gamma_{m,k}$ for each subcarrier as shown in FIG. 8B from the received frequency response estimation value. Here, SNR values $\gamma_{m,k}$ express values where SNR values are subject to logarithmic conversion using time $t_k$ of the mth subcarriers (m=0, 1, 2, 3, ..., M−1). Further, M expresses total number of subcarriers.

Channel state memory section 181 stores SNR values $\gamma_{m,k}$ inputted from quality level calculating section 180. SNR values $\gamma_{m,k}$ are updated every time calculated anew by quality level calculating section 180.

An updating period of the channel response estimation value and calculating period of SNR values $\gamma_{m,k}$ are set to be equal to or less than the feedback period of the CSI frame. Further, the updating period may also be set independently from the feedback period. However, the updating period is controlled so that updating processing to channel state memory section 181 during CSI frame generation does not occur.

SNR values $\gamma_{m,k}$ calculated for each subcarrier are utilized at average quality level calculating section 182 for calculating an average SNR value over all subcarriers. The average SNR value can be obtained from the following equation (1). Further, a true value of the SNR value of the mth subcarrier estimated at time $t_k$ is expressed by the following equation (2), and the average value of the SNR values of the true values for all subcarriers can be expressed by the following equation (3).

$$\bar{\gamma}_k = 10 \log_{10}(\bar{\Gamma})) \quad (1)$$

$$\Gamma_{m,k} = 10^{\gamma_{m,k}/10} \quad (2)$$

$\Gamma_{m,k}$: SNR value (true value) of mth subcarrier estimated at time $t_k$ $$\bar{\Gamma}_k = \frac{1}{M} \sum_{m=0}^{M-1} \Gamma_{m,k} \quad (3)$$

$\bar{\Gamma}_k$: average SNR value (true value) of $\Gamma_{m,k}$

Next, subtracting section 183 subtracts the average SNR value from SNR values $\gamma_{m,k}$ for each subcarrier using the following equation (4), and calculates differential SNR values $\Delta\gamma_{m,k}$ for each subcarrier.

$$\Delta\gamma_{m,k} = \gamma_{m,k} - \bar{\gamma}_k \quad (4)$$

Differential quality level memory section 184 stores differential SNR values $\Delta\gamma_{m,k}$ calculated by subtracting section 183. Differential SNR values $\Delta\gamma_{m,k}$ are updated every time calculated anew by subtracting section 183.

Subcarrier block configuration section 185 sets a block size for each subcarrier block and $\Delta SNR_{BLK}$ for each subcarrier block by referring to differential SNR values $\Delta\gamma_{m,k}$ and the look-up table.

Figure 9:
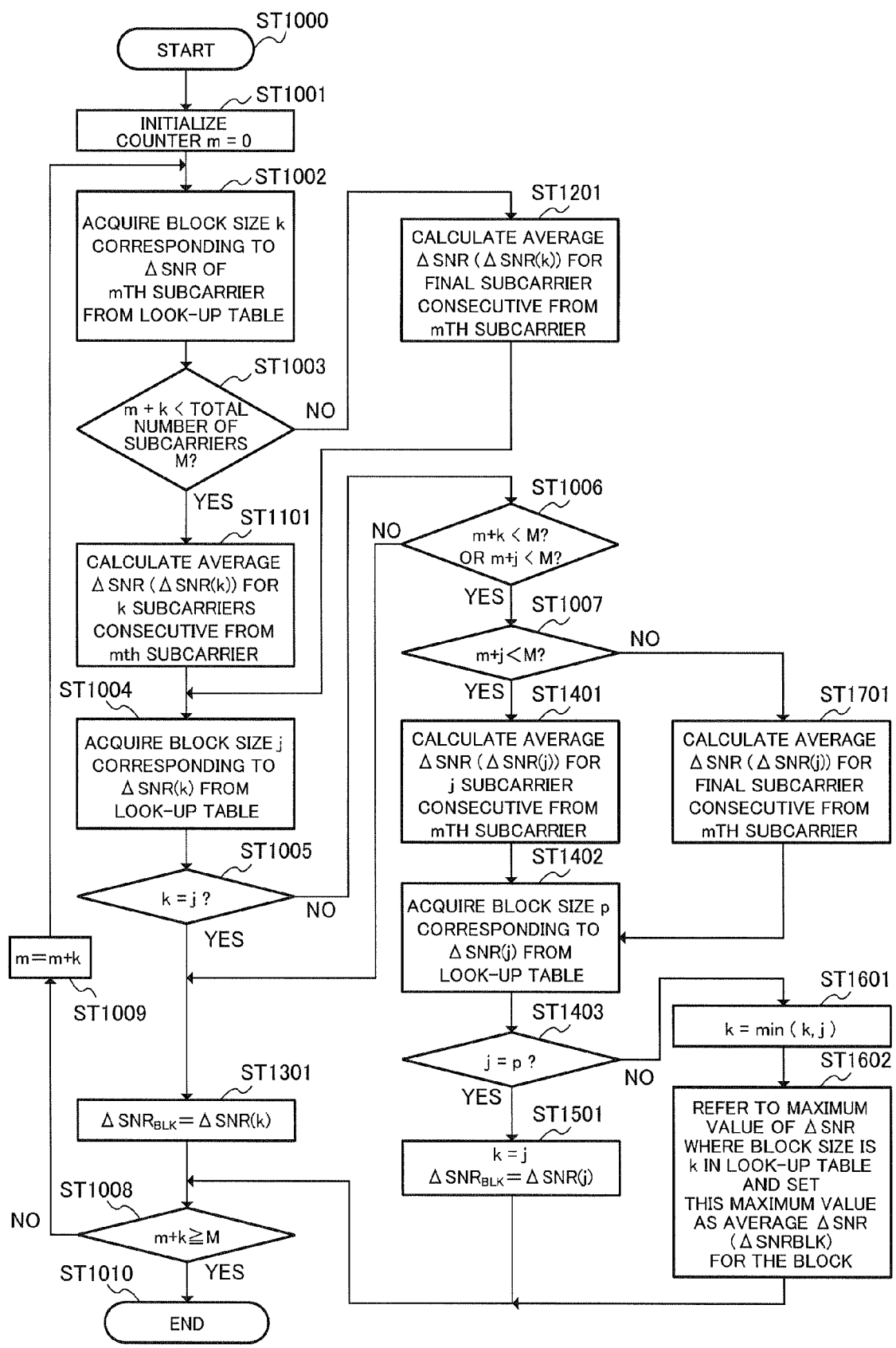
FIG. 9 is a block diagram illustrating the operation of a subcarrier block configuring section according to Embodiment 1 of the present invention.

Here, the processing procedure of subcarrier block configuration section 185 will be explained using the flowchart of FIG. 9.

First, after starting processing in step ST1000, in step ST1001, counter m corresponding to a subcarrier number (here, defined as m=0, 1, 2, ..., M−1 in ascending order of the frequency) is initialized to 0.

In step ST1002, block size k corresponding to differential SNR values $\Delta\gamma_{m,k}$ of the mth subcarrier are acquired from the look-up table.

In step ST1003, it is determined whether or not the sum of counter value m and block size k is smaller than total number of subcarriers M. As a result of the determination, when the sum of counter value m and block size k is smaller than total number of subcarriers M (ST1003:YES), the flow proceeds to step ST1101, and, when the sum of counter value m and block size k is greater than or equal to total number of subcarriers M (ST1003: NO), the flow proceeds to step ST1201.

In step ST1101, the average differential SNR value (ΔSNR (k)) is calculated as an average value of the ΔSNR values of the consecutive k subcarriers including the mth subcarrier, and the flow proceeds to step ST1004. On the other hand, in step ST1201, the average differential SNR value (ΔSNR(k)) is calculated as an average value of the ΔSNR values consecutive from the mth subcarrier to the final (M−1th) subcarrier, and the flow proceeds to step ST1004.

In step ST1004, block size j corresponding to the average differential SNR value (ΔSNR(k)) obtained in step ST1101 or ST1201 is acquired from the look-up table.

In step ST1005, it is confirmed whether or not block size k acquired in step ST1002 and block size j acquired from the look-up table based on the average differential SNR value (ΔSNR(k)) match. This step is provided to determine whether or not the relationship between the average differential SNR value for each block and the block size conflicts with the setting of the look-up table.

When block size k and block size j are same value (ST1005:YES), there is no conflict with respect to the setting of the look-up table, and therefore, in the next step ST1301, the average differential SNR value (ΔSNR(k)) is decided as the final average differential SNR value ($\Delta SNR_{BLK}$) of the subcarrier block, and the flow proceeds to step ST1008.

When block size k and block size j are not same value (ST1005: NO), a conflict has occurred with respect to the setting of the look-up table. In order to eliminate this conflict, steps ST1006, ST1007, ST1701, ST1401, ST1402, ST1403, ST1501, ST1601 and ST1602 are provided thereafter.

In step ST1006, it is determined whether or not m+k<M, and whether or not m+j<M. As a result of this determination, when m+k<M, or m+j<M (ST1006:YES), the flow proceeds to step ST1007, and, when m+k≧M, and m+j≧M (ST1006: NO), the flow proceeds to step ST1301.

In step ST1007, it is determined, with the same object as step ST1003, whether or not m+j<M for block size j. As a result of the determination, when m+j<M (ST1007: YES), the flow proceeds to step ST1401, and, when m+j≧M (ST1007: NO), the flow proceeds to step ST1701.

In step ST1401, the average differential SNR value (ΔSNR(j)) is calculated as an average value of the ΔSNR values of the consecutive j subcarriers including the mth subcarrier, and the flow proceeds to step ST1402. On the other hand, in step ST1701, the average differential SNR value (ΔSNR(j)) is calculated as an average value of the ΔSNR values consecutive to the final (M−1th) subcarrier including the mth subcarrier, and the flow proceeds to step ST1402.

In step ST1402, block size p is acquired from the look-up table using ΔSNR(j). Next, in step ST1403, it is confirmed whether or not block size j and block size p match.

When block size j and block size p are same vale (ST1403: YES), in step ST1501, the value of k is rewritten to j(=p), ΔSNR(j) is decided as the final average differential SNR value (ΔSNR$_{BLK}$) of this subcarrier block, and the flow proceeds to step ST1008. On the other hand, when block size j and block size p are not same value (ST1403: NO), in step ST1601, as shown in the next equation (5), the smaller value of block size k and block size j is set as new block size k, and the flow proceeds to step ST1602.

$$k=\min(k,j) \quad (5)$$

In step ST1602, the maximum value of the ΔSNR value where the block size is k is acquired from the look-up table. The acquired maximum value is then set as the average differential SNR value (ΔSNR$_{BLK}$) of this subcarrier block.

Then, in step ST1008, it is determined whether or not m+k≧M in order to determine whether or not processing for dividing into blocks is complete for all subcarriers, and if it is determined that m+k<M (ST1008: NO), the flow proceeds to step ST1009. In step ST1009, block size k is added to counter value m, counter value m is updated, and the flow returns to step ST1002 in order to execute processing for the next subcarrier block. On the other hand, if it is determined that m+k≧M (ST1008: YES), the flow proceeds to step ST1010 and the flow ends.

Here, the above-described processing procedure will be described more specifically using FIGS. 10 to 12. FIG. 10 shows an example of the differential SNR value for each subcarrier held in differential quality level memory section 184.

Block size k corresponding to the differential SNR value of the 0th subcarrier (SC0) is acquired from the look-up table of FIG. 6 (ST1002). The differential SNR value of the 0th subcarrier (SC0) is −2.5 dB, and the corresponding block size is therefore "4" (k=4).

The average value (ΔSNR(k)) of the differential SNR values for four subcarriers consecutive from the 0th subcarrier (SC0) is then calculated (ST1101). This average value is calculated by averaging the differential SNR values in the logarithmic domain as is. As a result, compared to the case of calculating the average value using the true value, it is possible to make the average value lower and set the block size to be smaller.

The average value of the differential SNR values for the 0th to 3rd subcarriers (SC0 to SC3) is calculated using the following equation (6).

$$\Delta SNR(k)=((-2.5)+(-1.5)+(-0.5)+0.5)/4=-1 \,[\text{dB}] \quad (6)$$

Here, the average value of the differential SNR values is obtained using the differential SNR values in the logarithmic domain as is, but it is also possible to obtain the average value after returning to the true value. Further, the smallest differential SNR value out of the consecutive k subcarriers may also be outputted.

Block size j corresponding to the calculated ΔSNR(k) is the "4" from the look-up table of FIG. 6 (ST1004).

Next, it is confirmed whether block size k and block size j match (ST1005). In this case, j=k=4. The block size of the first subcarrier block (B1) is decided, and the differential SNR value of this subcarrier block is also decided (ST1301).

As a result of the above processing, as shown in FIG. 11, the first subcarrier block (B1) is configured with four subcarriers of the 0th subcarrier (SC0) to the 3rd subcarrier (SC3). Further, the differential SNR value of the first subcarrier block (B1) is −1 dB.

Processing for the next subcarrier block then starts from the 4th subcarrier (SC4). When the memory section is at the state of FIG. 10, through the similar processing as the first subcarrier block (B1), the second subcarrier block (B2) and the 3rd subcarrier block (B3) are configured. Namely, for the second subcarrier block (B2), the block size is 5 subcarriers (SC4 to SC8), and the differential SNR value is 2.8 dB. For the third subcarrier block (B3), the block size is 5 subcarriers (SC9 to SC13), and the differential SNR value is 3.5 dB.

Next, the flow shifts to the processing for the 4th subcarrier block (B4). For this block, processing different from that for the above-mentioned block is included.

The differential SNR value of the 14th subcarrier (SC14) is −0.5 dB, and "4" is acquired as block size k from the look-up table of FIG. 6.

ΔSNR(k) for four subcarriers consecutive from the 14th subcarrier (SC14) is then calculated (ST1101). The average value of the differential SNR values for the 14th to 17th subcarriers (SC14 to SC17) is calculated using the following equation (7).

$$\Delta SNR(k) = ((-0.5)+(-3.0)+(-7.5)+(-15.0))/4 \quad (7)$$
$$= -6.5\,[\text{dB}]$$

Block size j corresponding to the calculated ΔSNR(k) is then acquired from the look-up table of FIG. 6 (ST1004). In this case, ΔSNR(k)=−6.5, and acquired block size j is "3".

Therefore, block size k, that is, "4" used in calculation of ΔSNR(k) and the block size j, that is, "3" obtained based on ΔSNR(k) do not match (ST1005: NO). When the CSI is fed back without eliminating the conflict with the setting content of the look-up table, the SNR value for each subcarrier cannot be correctly regenerated at transmission apparatus 100, and therefore the following processing is carried out.

Specifically, ΔSNR(j) for three subcarriers consecutive from the 14th subcarrier (SC14) is then calculated (ST1401). The average value of the differential SNR values for the 14th to 16th subcarriers (SC14 to SC16) is calculated using the following equation (8).

$$\Delta SNR(j)=((-0.5)+(-3.0)+(-7.5))/3=-3.7\,[\text{dB}] \quad (8)$$

Block size j corresponding to the calculated ΔSNR(j) is then acquired from the look-up table of FIG. 6 (ST1402). In this case, ΔSNR(j)=−3.7, and block size p is therefore "4".

Here, block size j, that is, "3" used in calculation of ΔSNR(j) and block size p, that is, "4" obtained based on ΔSNR(j) do not match (ST1403: NO). Therefore, in order to make the relationship between the block size and the ΔSNR$_{BLK}$ to be in accordance with the look-up table, the following processing is carried out.

First, the smaller value of k and j is selected as the value of k (ST1601). As k=4 and j=3, "3" is selected here. The range of the differential SNR value where the block size is "3" is −10 dB<ΔSNR≦−5 dB from the look-up table of FIG. 6, and therefore −5 dB that is closest to −3.7 dB is set as the differential SNR value (ΔSNR$_{BLK}$) for this block (ST1602).

As a result of the above processing, as shown in FIG. 11, the 4th subcarrier block (B4) is configured with three subcarriers of the 14th subcarrier (SC14) to the 16th subcarrier (SC16), and ΔSNR$_{BLK}$ for this block is −5 dB. In this way, even when the block size used in the process of calculating ΔSNR$_{BLK}$ is different from the block size corresponding to ΔSNR$_{BLK}$ in the look-up table, by resetting ΔSNR$_{BLK}$ using the closest ΔSNR, it is possible to divide subcarriers into blocks without conflict with the setting content of the look-up table.

Figures 12, 13, 14:
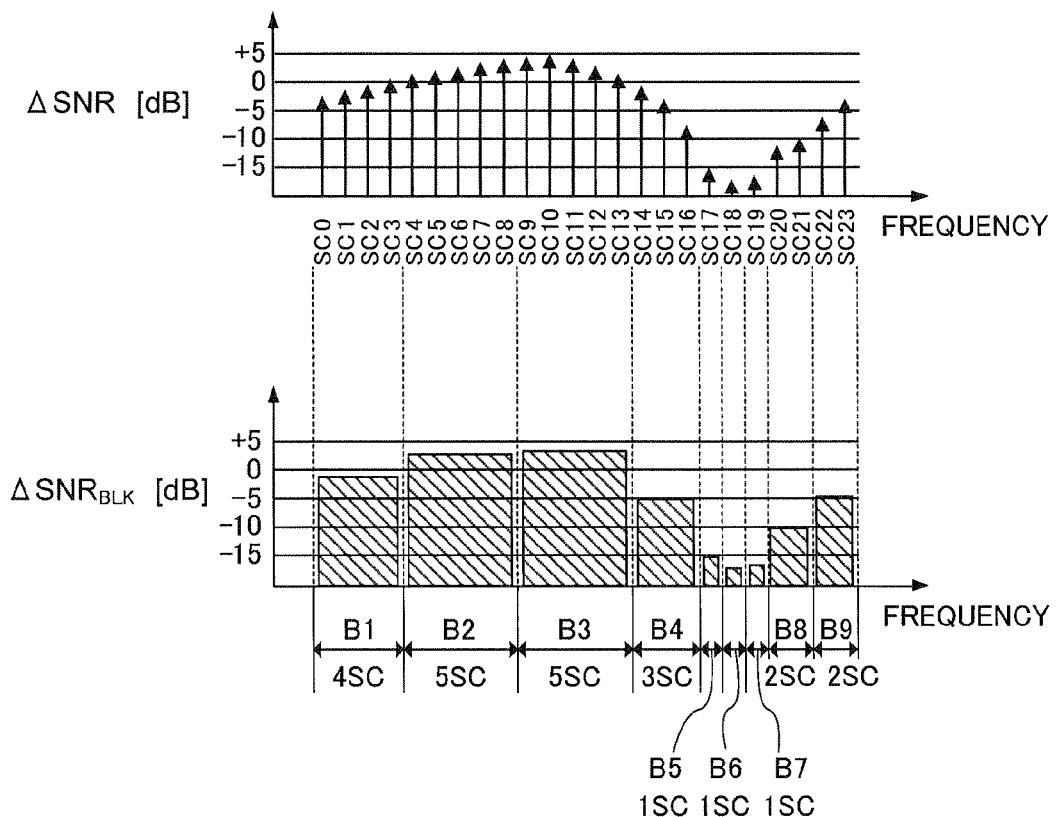
FIG. 12 schematically shows division into blocks of all subcarriers according to Embodiment 1 of the present invention.
FIG. 13 shows a frame format of a CSI frame according to Embodiment 1 of the present invention.
FIG. 14 shows a modified example of the frame format of the CSI frame according to Embodiment 1 of the present invention.

By repeating the similar processing, as shown in FIG. 12, it is possible to divide all subcarriers into blocks, and calculate the differential SNR value (ΔSNR$_{BLK}$) for each block without conflict with the setting of the look-up table.

ΔSNR$_{BLK}$ set by the above-described processing is then outputted to feedback frame generating section 187.

Feedback frame generating section 187 configures a CSI frame using the differential SNR value (ΔSNR$_{BLK}$) for each subcarrier block outputted from subcarrier block configuration section 185 and the average SNR value which is the output of average quality level calculating section 182.

Specifically, the CSI frame of the format as shown in FIG. 13 is generated. In FIG. 13, the average SNR value is arranged at the side of the top part of the CSI frame, and after the average SNR value, the differential SNR values of the subcarrier blocks are arranged in ascending order of the block number. By adopting this kind of frame format, at transmission apparatus 100, it is possible to set block size using the differential SNR value indicated in the CSI frame as is, and simplify the processing within transmission apparatus 100.

It is also possible to use the frame format shown in FIG. 14 instead of using the frame format shown in FIG. 13. In FIG. 14, after the average SNR value, SNR values of the subcarrier blocks are arranged in ascending order of the block number. The SNR value of each subcarrier block is then obtained by calculating the sum of the average SNR value and the differential SNR value for each subcarrier block at CSI frame generating section 166. Namely, in the example of FIG. 14, the SNR value for each subcarrier block can be used as a value expressing the channel state level for each subcarrier block.

The frame format is by no means limited to that described above. For example, it is also possible to adopt a frame format where the average SNR value is added to the end of the CSI frame. Further, it is also possible to adopt a frame format where the differential SNR values or SNR values of the subcarrier blocks are arranged in descending order of the block number. An arbitrary frame format can be adopted if the frame format has an arrangement order commonly specified between transmission and reception.

Figure 15:
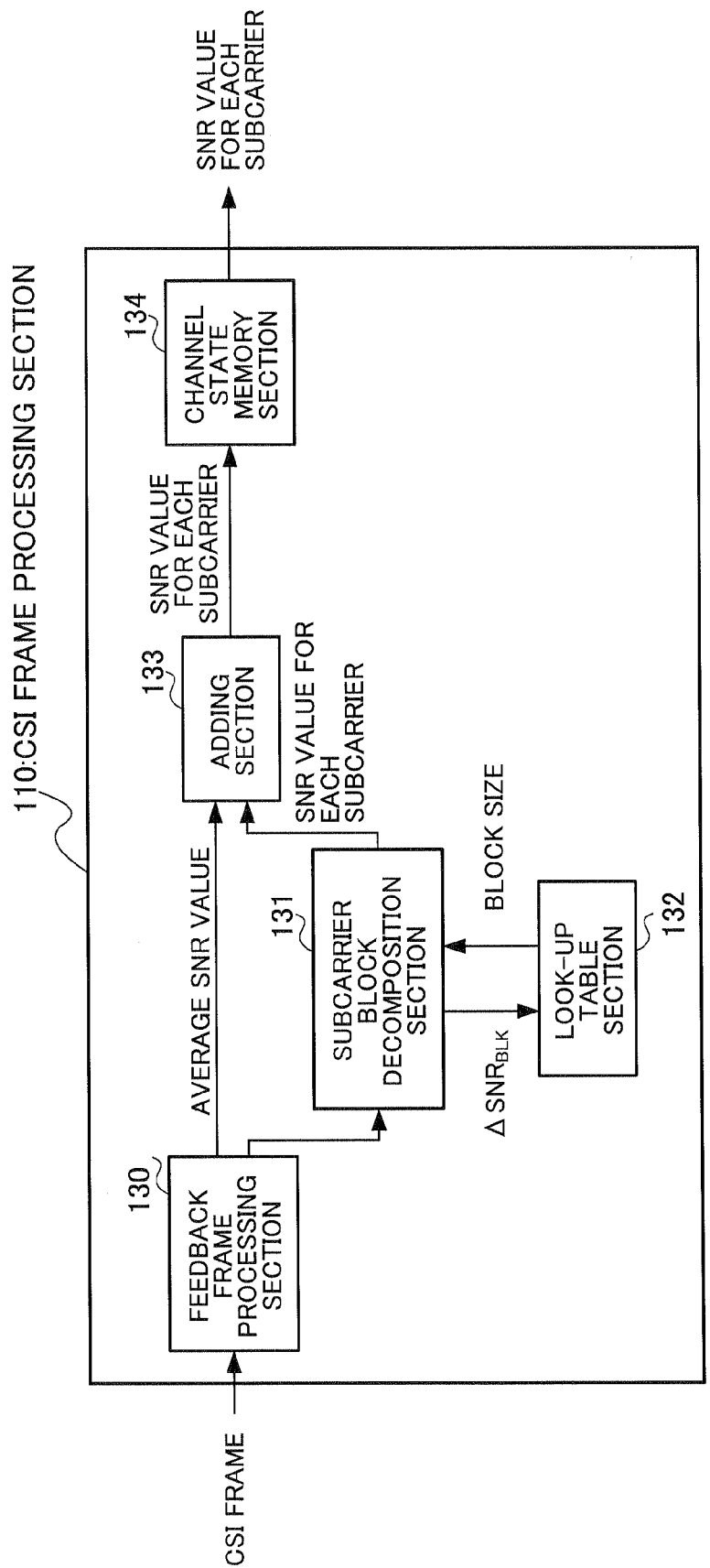
FIG. 15 is a block diagram showing a configuration of a CSI frame processing section according to Embodiment 1 of the present invention.

Next, the internal configuration and the operation of CSI frame processing section 110 will be described. As shown in FIG. 15, CSI frame processing section 110 has feedback frame processing section 130, subcarrier block decomposition section 131, look-up table section 132, adding section 133 and channel state memory section 134.

Feedback frame processing section 130 as an extraction section extracts the average SNR value and differential SNR value for each subcarrier block from the CSI frame transmitted from reception apparatus 150, and outputs the average SNR value to adding section 133 and the differential SNR value for each subcarrier block to subcarrier block decomposition section 131.

Subcarrier block decomposition section 131 as a generating section sets the block size for each subcarrier block by acquiring from look-up table section 132 the block size corresponding to the differential SNR value for each subcarrier block inputted from feedback frame processing section 130. The differential SNR value of the subcarriers included in each subcarrier block is then generated by duplicating the inputted differential SNR value according to the block size. The generated differential SNR value for each subcarrier is outputted to adding section 133.

As a result, it is possible to appropriately set the block size taking into consideration the relationship between the differential SNR value of each subcarrier and correlation between the neighboring subcarriers, and improve regeneration accuracy of the CSI (here, the SNR value) of each subcarrier.

Further, it is possible to share the block size corresponding to the differential SNR value between transmission and reception by setting the block size according to the look-up table having the setting reflecting the relationship between the differential SNR value of each subcarrier and correlation between the neighboring subcarriers.

In this embodiment, the differential SNR value for each subcarrier is generated by duplicating the differential SNR value, so that the differential SNR values of a plurality of subcarriers included in the same subcarrier block become the same. However, the method for generating the differential SNR value for each subcarrier is by no means limited to duplication of the differential SNR value. Further, it is also possible to generate the differential SNR value for each subcarrier so that the differential SNR values of a plurality of subcarriers belonging to the same subcarrier block are mutually different.

Look-up table section 132 as a holding section has exactly the same configuration as look-up table section 186 provided within reception apparatus 150. Look-up table section 132 has the look-up table as shown in FIG. 6, which is common between transmission and reception. When a differential SNR value is inputted from subcarrier block decomposition section 131, a block size corresponding to the inputted differential SNR value is outputted to subcarrier block decomposition section 131 according to the setting of the look-up table.

Adding section 133 then calculates an SNR value for each subcarrier by adding the average SNR value and the differential SNR value for each subcarrier. Channel state memory section 134 holds the calculated SNR value for each subcarrier. The held SNR value is outputted to modulation parameter deciding section 111 as CSI of each subcarrier.

Here, the case has been described as an example where the CSI frame (FIG. 13) indicating the differential SNR value for each subcarrier block is used, but it is also possible to use a CSI frame (FIG. 14) indicating the SNR value for each subcarrier block. In this case, feedback frame processing section 130 extracts the average SNR value and the SNR value for each subcarrier block from the CSI frame, and outputs the average SNR value to adding section 133 and subcarrier block decomposition section 131, and outputs the SNR value for each subcarrier block to subcarrier block decomposition section 131.

Further, in this case, subcarrier block decomposition section 131 acquires the differential SNR value for each subcarrier block by subtracting the average SNR value from the SNR value for each subcarrier block inputted from feedback frame processing section 130. The block size corresponding to the acquired differential SNR value is then acquired from the look-up table.

Figure 16:
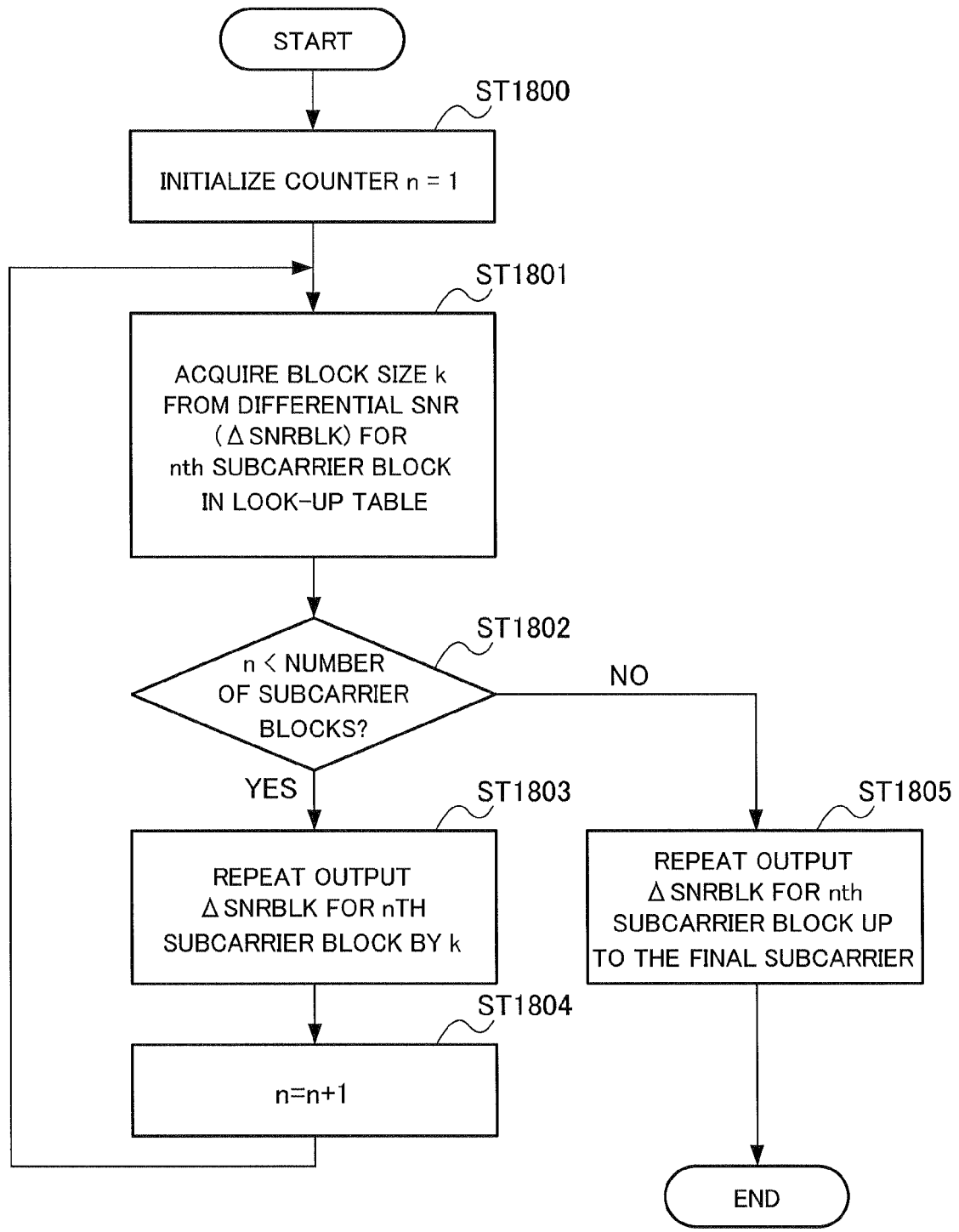
FIG. 16 is a flowchart illustrating the operation of a subcarrier block decomposition section according to Embodiment 1 of the present invention.

Next, an example of the operation of subcarrier block decomposition section 131 will be described. FIG. 16 is a flowchart illustrating the operation of subcarrier block decomposition section 131.

Figures 17, 18, 19:
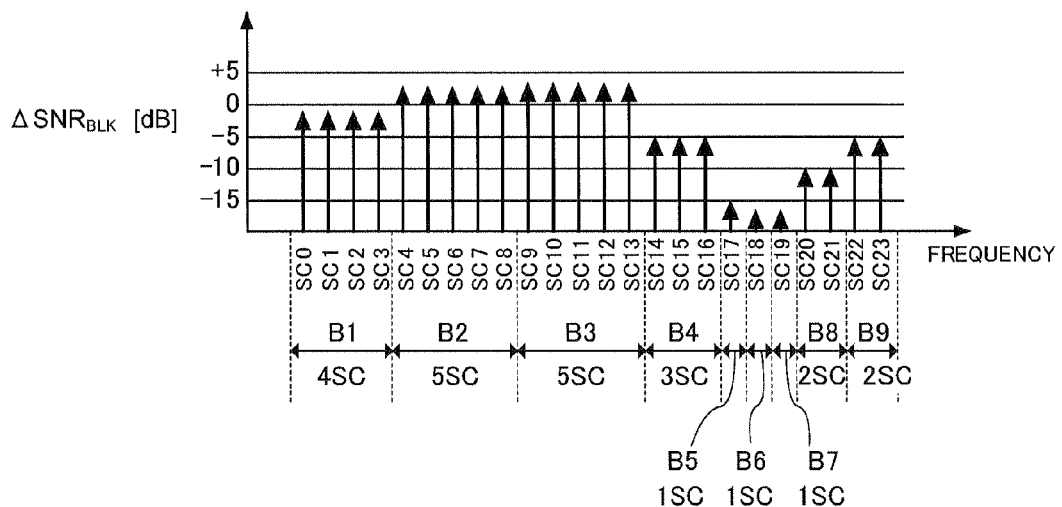
FIG. 17 shows an example of the CSI frame according to Embodiment 1 of the present invention.
FIG. 18 shows decision results of the block size of each subcarrier block according to Embodiment 1 of the present invention.
FIG. 19 shows regeneration results of an SNR value of each subcarrier according to Embodiment 1 of the present invention.

Subcarrier block decomposition section 131 receives the differential SNR value ($\Delta SNR_{BLK}$) for each subcarrier block, except the average SNR value, out of the CSI frame shown in FIG. 17. In order to acquire the number of subcarriers configuring the received subcarrier block, the block size corresponding to the differential SNR value of this subcarrier block is acquired in order from the first subcarrier block (B1) to the final subcarrier block (B9) by referring to the look-up table of FIG. 6. As a result, the block size of each subcarrier block is decided as shown in FIG. 18.

More specifically, first, counter value n is initialized to "1" (ST1800). Block size k corresponding to the differential SNR value ($\Delta SNR_{BLK}$) of the nth subcarrier block is acquired from the look-up table of FIG. 6 (ST1801). In the case of the first subcarrier block (B1), the differential SNR value is −1 dB. As a result, the block size of the first subcarrier block (B1) is set by acquiring "4" as the block size corresponding to −1 dB. Similarly for the case of the second subcarrier block (B2), a block size "5" corresponding to $\Delta SNR_{BLK}$=2.8 is acquired. Further, at the final subcarrier block (B9), $\Delta SNR_{BLK}$=−4, and the corresponding block size within the look-up table is "4". However, although total number of subcarriers M is "24", the subcarrier number of the 9th subcarrier block starts from "22". As a result, the subcarrier size of the 9th subcarrier block (B9) is processed as "2" (that is, SC22 to SC23) (ST1805).

In this way, it is possible to specify the block size of the subcarrier block set at reception apparatus 150 by referring to the same look-up table as for reception apparatus 150.

After setting the block size of the nth subcarrier block, block number (n) is compared with the number of subcarrier blocks (that is, the maximum block number) (ST1802). If n has reached the number of subcarrier blocks (ST1802: NO), the flow proceeds to step ST1805, and, if n has not reached the number of subcarrier blocks (ST1802: YES), the flow proceeds to step ST1803.

In step ST1803, by repeating the differential SNR value for the nth subcarrier k times and outputting the result to adding section 133, as shown in FIG. 19, the differential SNR value for each subcarrier belonging to this subcarrier block is regenerated. After step ST1803, in step ST1804, "1" is added to n to update n. The flow returns to step ST1801.

On the other hand, in step ST1805, as shown in FIG. 19, the differential SNR value for each subcarrier belonging to this subcarrier block is regenerated by repeating the differential SNR value of the nth subcarrier block to the final subcarrier and outputting the result to adding section 133. When the processing of step ST1805 finishes, the processing flow is finished.

According to this embodiment, at reception apparatus 150, the SNR value for each subcarrier block is set based on a plurality of SNRs corresponding to a plurality of subcarriers and the average SNR of the plurality of subcarriers, and a CSI frame which indicates a value expressing the average SNR and a value expressing the SNR for each subcarrier block is generated. On the other hand, at transmission apparatus 100, the value expressing the average SNR and the value expressing the SNR of each subcarrier block are extracted from the CSI frame, and the SNR for each subcarrier is generated based on the extracted value expressing the average SNR and value expressing the SNR of each subcarrier block. Therefore, it is possible to feed back the combination of the average SNR and the SNR of each subcarrier block from reception apparatus 150 to transmission apparatus 100, and not only regenerate the SNR of each subcarrier without the identification information of each subcarrier and realize the appropriate transmission control at transmission apparatus 100, but also eliminate the need for feeding back the identification information of each subcarrier, so that it is possible to maintain high data throughput and reduce the amount of data for the feedback information.

According to this embodiment, the SNR having high correlation with the correlation between the neighboring subcarriers is used as a channel state level, so that it is possible to optimally carry out setting of the block size.

Embodiment 2

Figure 20:
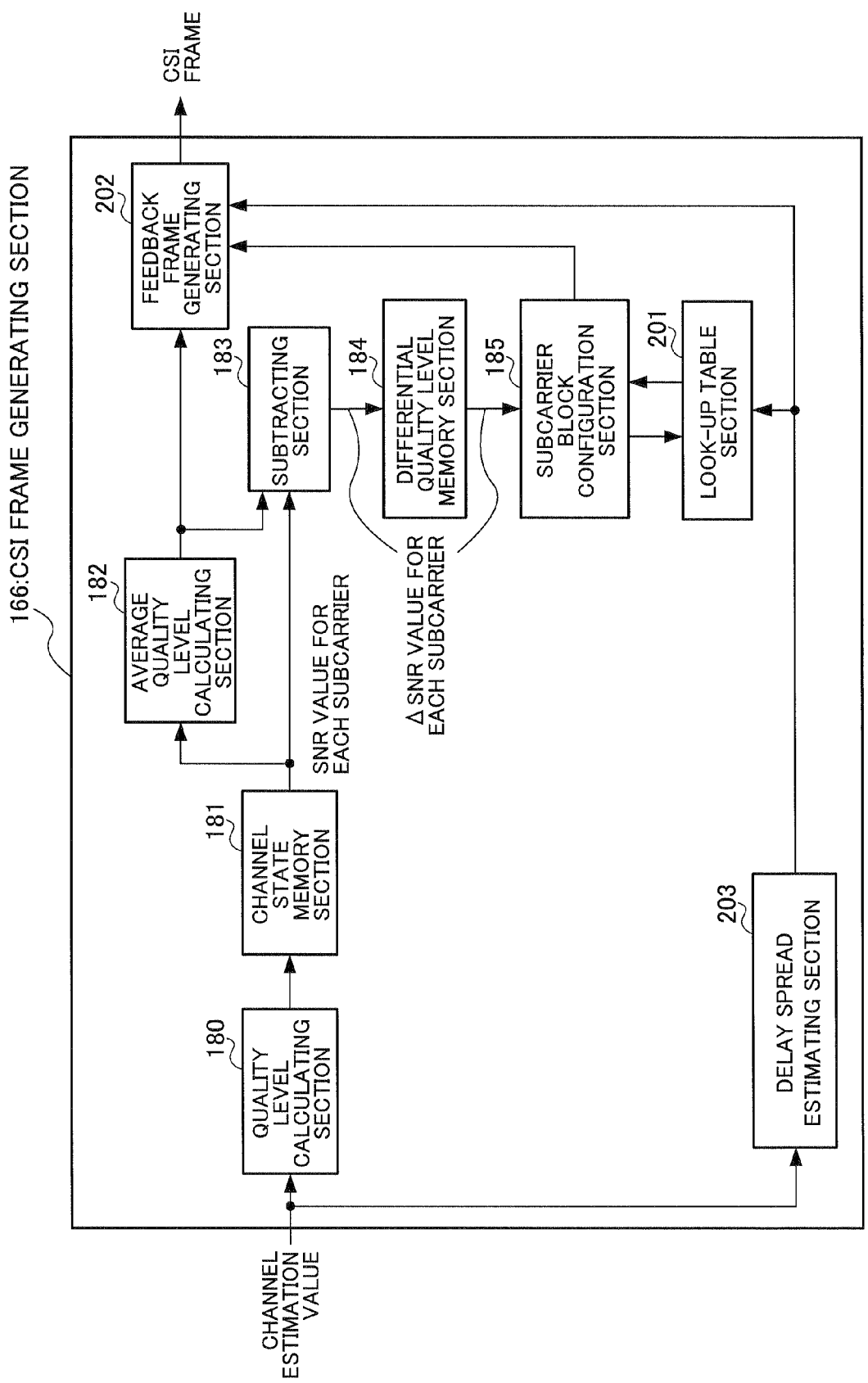
FIG. 20 is a block diagram showing a configuration of a CSI frame generating section according to Embodiment 2 of the present invention.

FIG. 20 is a block diagram showing a configuration of the CSI frame generating section provided at the reception apparatus according to Embodiment 2 of the present invention. The reception apparatus according to this embodiment has basically the same configuration as reception apparatus 150 described in Embodiment 1. Components that are the same as or similar to those described in Embodiment 1 will be assigned the same reference numerals without further explanation.

CSI frame generating section 166 of FIG. 20 has look-up table section 201 and feedback frame generating section 202 in place of look-up table section 186 and feedback frame generating section 187 of CSI frame generating section 166 described in Embodiment 1. Further, delay spread estimating section 203 is also provided.

Delay spread estimating section 203 as an acquiring section estimates delay spread of a channel using the transmission response estimation value obtained at channel response estimating section 165. As a result of this estimation, a delay spread estimation value is obtained.

Look-up table section 201 as a holding section is different from look-up table section 186 described in Embodiment 1 in the point of switching the setting content of the look-up table used for configuring the subcarrier block at subcarrier block configuration section 185. Namely, look-up table section 201 switches the setting content of the look-up table based on the delay spread estimation value obtained by delay spread estimating section 203. Regarding points other than this, look-up table section 201 is the same as look-up table section 186.

Feedback frame generating section 202 as a generating section is different from feedback frame generating section 187 described in Embodiment 1 in the point that the delay spread estimation value obtained by delay spread estimating section 203 is further used upon generating the CSI frame. Regarding points other than this, feedback frame generating section 202 is the same as feedback frame generating section 187.

Next, the operation of CSI frame generating section 166 having the above configuration will be described.

Delay spread estimating section 203 calculates a delay spread estimation value for a channel using the channel response estimation value that is a frequency response value for the channel calculated by channel response estimating section 165.

The method for estimating delay spread of channel response is by no means limited to a specific approach but the following is given as an example.

Figure 21:
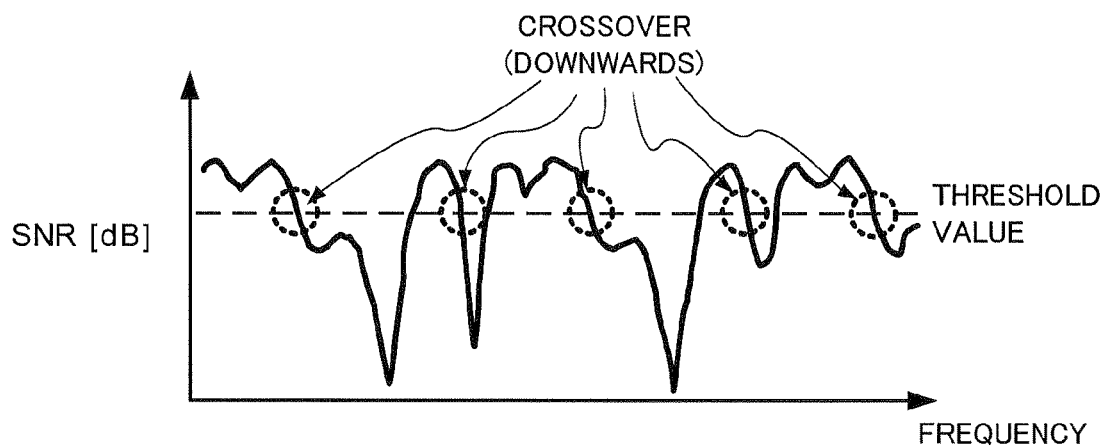
FIG. 21 illustrates an example of a method for estimating delay spread according to Embodiment 2 of the present invention.
Figure 22:
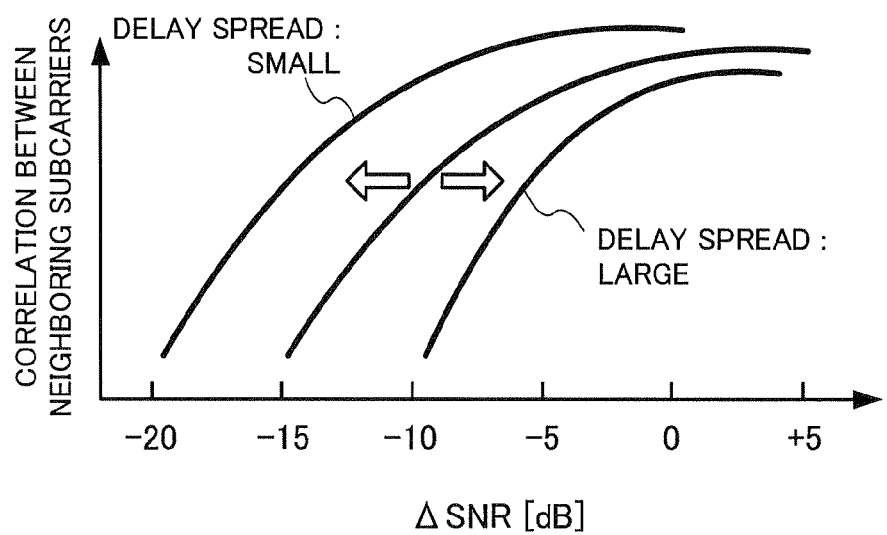
FIG. 22 shows a statistical relationship between delay spread and correlation between neighboring subcarriers.

For example, as shown in FIG. 21, a given threshold value is set for the SNR characteristics (or amplitude characteristics) of the frequency response of the channel. The severity of fluctuation per unit of frequency is then detected from the number of times of crossing over this threshold from top to bottom (hereinafter referred to as "number of level crossovers"). When the number of level crossovers is large, frequency correlation of the transmission response—correlation between the neighboring subcarriers—is low. Conversely, when the number of level crossovers is small, correlation between the neighboring subcarriers is high. Therefore, as shown in FIG. 22, when the delay spread is large, the frequency correlation is low, and, when the delay spread is small, the frequency correlation is large, so that it is possible to estimate the scale of the delay spread from the number of level crossovers.

Figure 23A:
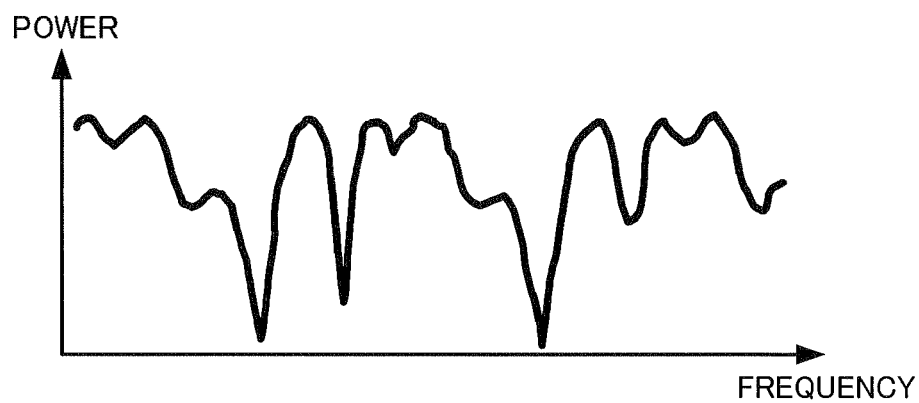
FIG. 23 illustrates another example of a method for estimating delay spread according to Embodiment 2 of the present invention.
Figure 23B:
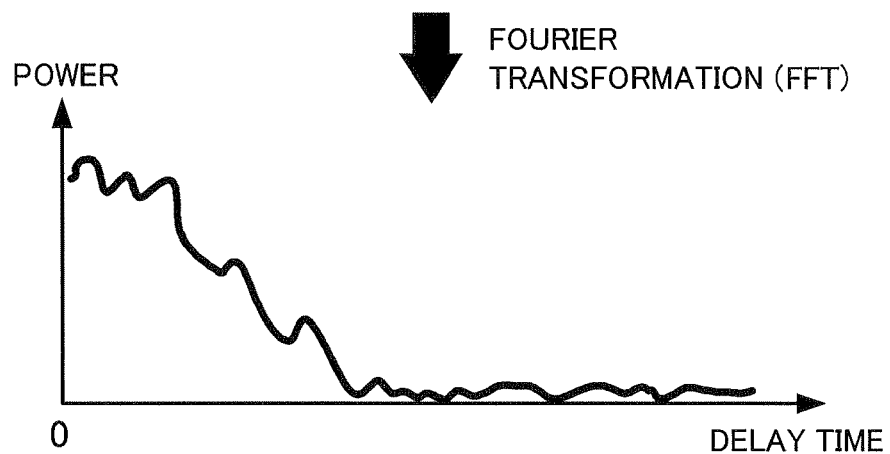

Further, in another example, as shown in FIGS. 23A and 23B, by converting the frequency response of the channel (FIG. 23A) to a time domain using Fourier transformation (FIG. 23B), it is possible to obtain an impulse response of the channel. It is also possible to calculate the delay spread from the obtained impulse response. It is possible to calculate the delay spread from the delay profile obtained as a result of time-averaging this impulse response. Within the range where the propagation environment does not drastically change, it is possible to estimate delay spread more accurately using the time-averaged delay profile.

In the example shown in FIGS. 23A and 23B, the delay profile is obtained using a method of estimating the frequency response, but the delay profile generation method is by no means limited to this. For example, it is also possible to obtain the impulse response directly in a time domain utilizing a reception result of a pilot signal or the like.

Delay spread estimating section 203 acquires a delay spread estimation value corresponding to detected number of level crossovers $N_L$ referring to a table such as shown, for example, in FIG. 24. The acquired delay spread estimation value is then outputted to look-up table section 201 and feedback frame generating section 202.

At look-up table section 201, the setting value of the look-up table is switched according to the scale of the delay spread estimation value inputted from delay spread estimating section 203.

More specifically, as shown in FIG. 25, the setting of any of the look-up tables are selected for the inputted delay spread estimation value. The setting values of the look-up tables corresponding to the inputted delay spread estimation values are shown in FIGS. 26 to 28. FIG. 26 shows a first look-up table used when setting A is selected in FIG. 25, FIG. 27 shows a second look-up table used when setting B is selected in FIG. 25, and FIG. 28 shows a third look-up table used when setting C is selected in FIG. 25. The control method from estimating delay spread to selecting the setting value of the look-up table is by no means limited to that described above. For example, it is also possible to adopt a configuration where number of level crossovers $N_L$ is outputted from delay spread estimating section 203, and the setting values of the look-up table are selected from number of level crossovers $N_L$ at look-up table section 201.

The look-up table held in look-up table section 201 is mainly characterized by the following two settings.

When the ΔSNR value is small, the block size is set to small, and, when the ΔSNR value is large, the block size is set to large as a first setting. As with the look-up table of FIG. 6 described in Embodiment 1, this kind of setting is based on the statistical relationship (FIG. 7) between the ΔSNR value of the subcarrier and the correlation between the neighboring subcarriers. Namely, when the ΔSNR value for a given subcarrier is small, the correlation between the neighboring subcarriers becomes low, and, when the ΔSNR value for a given subcarrier is large, the correlation between the neighboring subcarriers becomes high.

As a second setting, when the delay spread is large, the block size is set to small, and, when the delay spread is small, the block size is set to large. This kind of setting is based on the statistical relationship between the delay spread and the correlation between the neighboring subcarriers described using FIG. 22.

In this embodiment, the case has been described as an example where any of a plurality of look-up tables is selected according to the scale of the delay spread estimation value, but the method of switching the setting of the look-up table is by no means limited to this. For example, as shown in FIG. 29, at one look-up table, it is possible to set a function of the delay spread estimation value in advance so as to correlate with a ΔSNR value, and obtain the block size from this function.

Feedback frame generating section 202 generates a CSI frame having the frame format as shown in FIG. 30. In FIG. 30, the delay spread estimation value is arranged at the side of the top part of the CSI frame, and after the delay spread estimation value, the average SNR value is arranged, and differential SNR values of the subcarrier blocks are arranged in ascending order of the block number after the average SNR value. It is also possible to use the frame format shown in FIG. 31 instead of using the frame format shown in FIG. 30. In FIG. 31, after the average SNR value, SNR values of the subcarrier blocks are arranged in ascending order of the block number. The SNR value of each subcarrier block is acquired by calculating the sum of the average SNR value and the differential SNR value for each subcarrier block at CSI frame generating section 166.

The frame format is by no means limited to that described above. For example, it is also possible to adopt a frame format where the average SNR value is added to the end of the CSI frame. Further, it is also possible to adopt a frame format where differential SNR values or SNR values of the subcarrier blocks are arranged in descending order of the block number. An arbitrary frame format can be adopted if the frame format has an arrangement order commonly specified between transmission and reception.

In this embodiment, the case has been described as an example where the delay spread estimation value is arranged in the same CSI frame as various SNR values, but the frame format of the CSI frames is by no means limited to this. For example, it is also possible to adopt the same frame format as described in Embodiment 1 for this embodiment, and transmit the delay spread estimation value using another frame. In this case, control is carried out so that the setting of the look-up table is switched in synchronization with the timing of transmitting the delay spread estimation value to transmission apparatus 100.

Next, CSI frame processing section provided at the transmission apparatus according to this Embodiment will be described using FIG. 32. The transmission apparatus of this embodiment has the same basic configuration as transmission apparatus 100 described in Embodiment 1, and the CSI frame processing section of this embodiment has the same basic configuration as CSI frame generating section 110 described in Embodiment 1. Components that are the same as or similar to those described in Embodiment 1 will be assigned the same reference numerals without further explanation.

Figure 32:
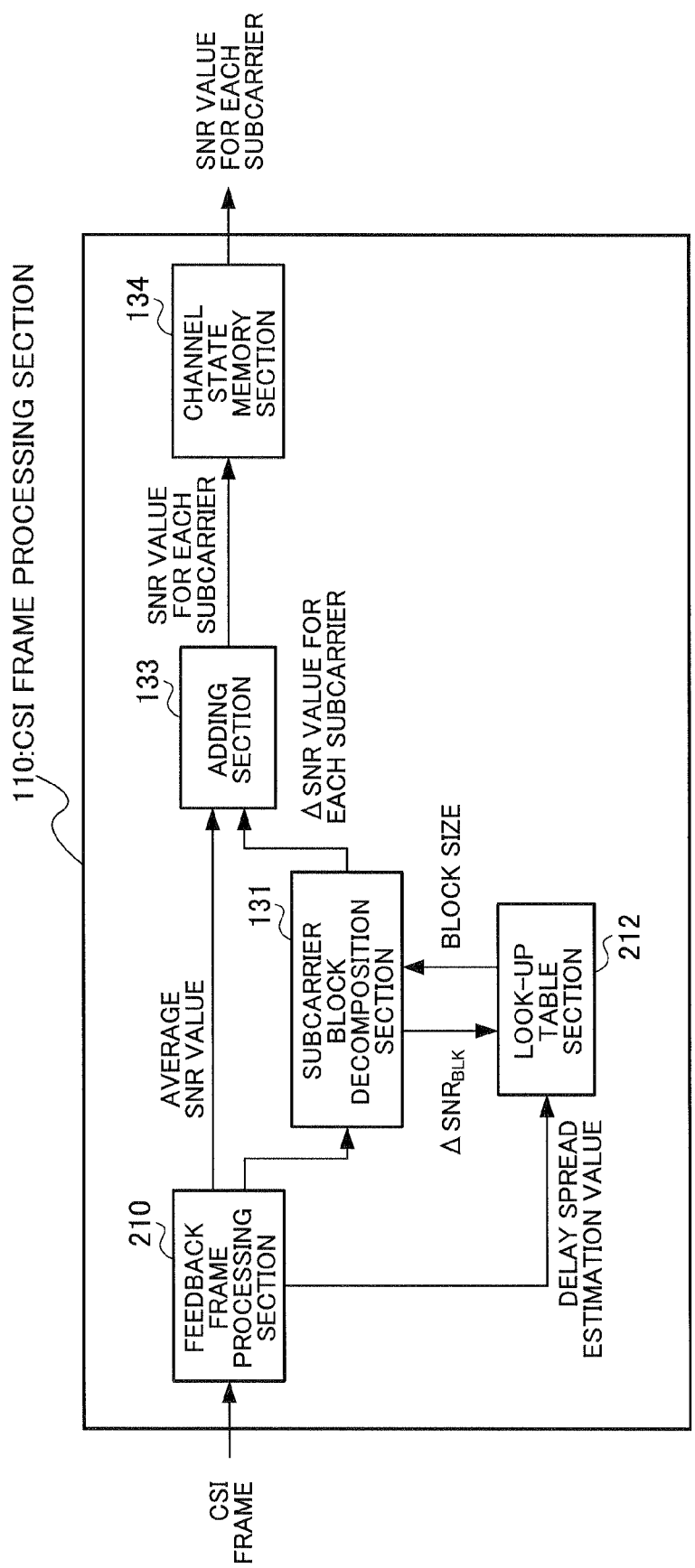
FIG. 32 is a block diagram showing a configuration of a CSI frame processing section according to Embodiment 2 of the present invention.

CSI frame processing section 110 shown in FIG. 32 has feedback frame processing section 210 and look-up table section 212 in place of feedback frame processing section 130 and look-up table 132 described in Embodiment 1.

Feedback frame processing section 210 as an extraction section extracts a delay spread estimation value, average SNR value and differential SNR value for each subcarrier block from the CSI frame transmitted from reception apparatus 150, and outputs the average SNR value to adding section 133, the differential SNR value for each subcarrier block to subcarrier block decomposition section 131, and the delay spread estimation value to look-up table section 212.

Look-up table section 212 as a holding section has exactly the same configuration as look-up table section 201 provided within reception apparatus 150. Look-up table section 212 holds look-up tables common between transmission and reception as shown in FIGS. 26 to 28 (or FIG. 29). When the differential SNR value is inputted from subcarrier block decomposition section 131, the block size corresponding to the inputted differential SNR value is outputted to subcarrier block decomposition section 131 according to the setting.

Further, look-up table section 212 switches the setting content of the look-up table using exactly the same operation as look-up table section 201 of reception apparatus 150 using the delay spread estimation value inputted from feedback frame processing section 210.

In this way, according to this embodiment, at reception apparatus 150, the block size is set to be smaller for larger delay spread, and the block size is set to be larger for smaller delay spread, and the CSI frame indicating a value expressing the delay spread is generated. Further, at transmission apparatus 100, the value expressing the delay spread indicated in the CSI frame is extracted, and the block size is set to be smaller for larger delay spread, and the block size is set to be larger for smaller delay spread. By this means, it is possible to appropriately set the block size taking into consideration the relationship between the delay spread and correlation between the neighboring subcarriers, and further reduce SNR errors of each subcarrier occurring as a result of subcarrier grouping.

Further, according to this embodiment, by setting the block size and the differential SNR value for each subcarrier block or SNR value according to the look-up table having the setting reflecting the relationship between delay spread and correlation between the neighboring subcarriers and the relationship between the differential SNR value and the correlation between the neighboring subcarriers, it is possible to suppress errors occurring as a result of grouping to a fixed level. Moreover, it is possible to share the group size corresponding to the combinations of delay spread and differential SNR values between transmission and reception, and implement processing without conflict between transmission and reception.

Embodiment 3

Figure 33:
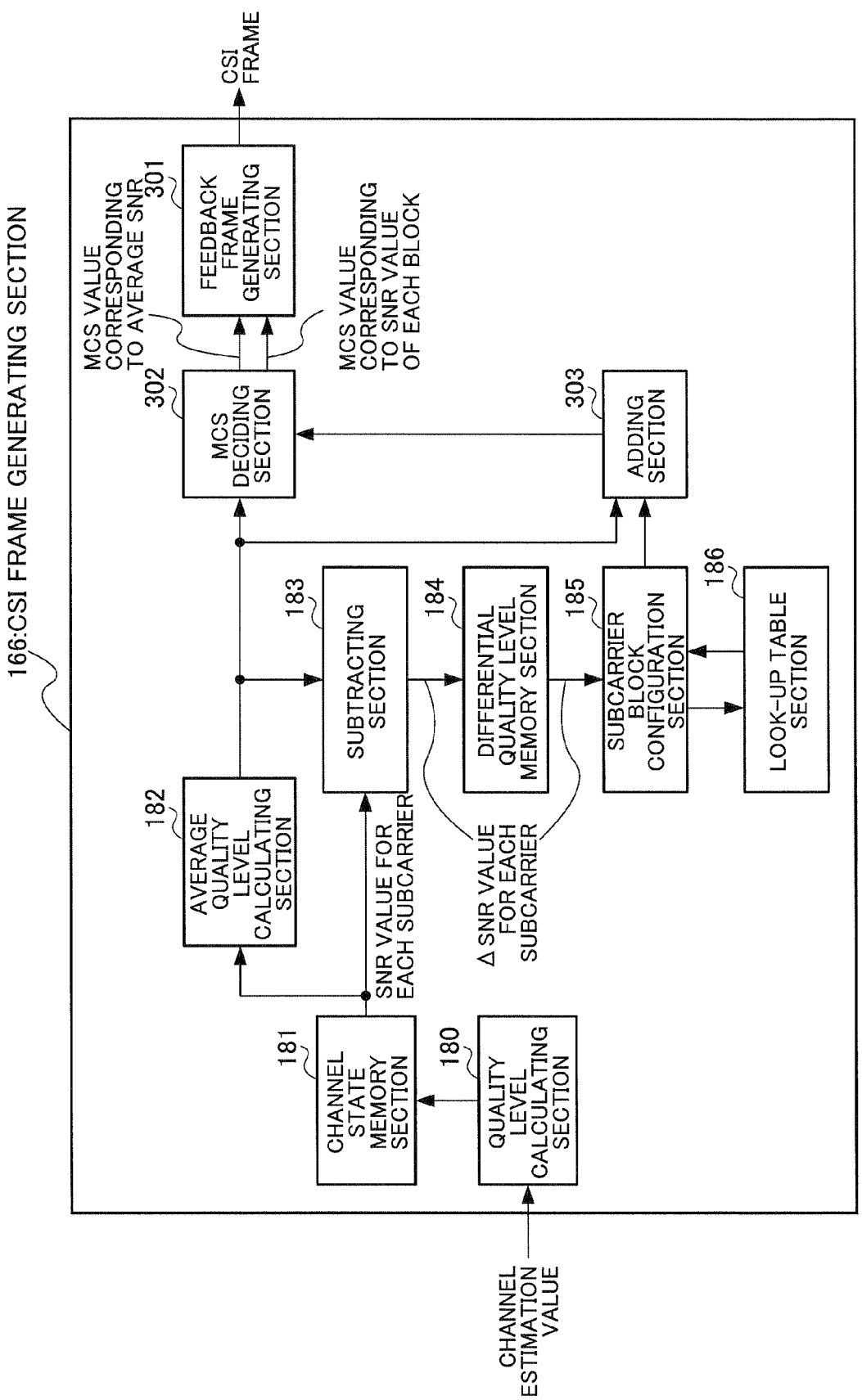
FIG. 33 is a block diagram showing a configuration of a CSI frame generating section according to Embodiment 3 of the present invention.

FIG. 33 is a block diagram showing a configuration of the CSI frame generating section provided at reception apparatus according to Embodiment 3 of the present invention. The reception apparatus of this embodiment has the same basic configuration as reception apparatus 150 described in Embodiment 1, and the CSI frame generating section of this embodiment has the same basic configuration as CSI frame generating section 166 described in Embodiment 1. Components that are the same as or similar to those described in Embodiment 1 will be assigned the same reference numerals without further explanation.

CSI frame generating section 166 has feedback frame generating section 301 in place of feedback frame generating section 187 described in Embodiment 1. MCS deciding section 302 and adding section 303 are further provided.

Adding section 303 calculates a SNR value for each subcarrier block by adding a differential SNR value for each subcarrier block that is an output of subcarrier block configuration section 185 and an average SNR value that is an output of average quality level calculating section 182.

MCS deciding section 302 decides a modulation and coding scheme (MCS) parameter (hereinafter referred to as "MCS value") corresponding to the inputted SNR value. Specifically, an MCS value corresponding to the average SNR value and an MCS value corresponding to the SNR value of each block are decided and outputted. If the inputted SNR value is low, the MCS value that is resistant to disturbances such as noise is selected. Further, if the inputted SNR value is high, the MCS value including a modulation scheme with a high order M-ary number or the MCS value including a high coding rate is selected.

Here, the MCS parameter (MCS value) expresses the combination of a modulation scheme, forward error correction coding scheme and coding rate.

In this embodiment, since the block size information is provided to the MCS value, there is correlation as shown in FIG. 34 between the look-up table and the MCS values.

More specifically, threshold values a to g of the look-up table are set so that the range of the SNR value to which the MCS value corresponds and the range of the ΔSNR value to which the block size of the look-up table corresponds become the same.

For example, as shown in FIG. 35, when the table having the setting such that the range of ΔSNR value to which each MCS value corresponds is switched at 3 dB intervals is used at MCS deciding section 302, as shown in FIG. 36, the look-up table having the setting such that the range of the ΔSNR value to which each block size corresponds is switched at 3 dB intervals is held in look-up table section 186. The switching interval at the look-up table may also be set to an integral multiple of the switching interval at the MCS value deciding table.

Therefore, the correspondence relationship between the MCS value and block size slides along with an increase and decrease of the average SNR value. For example, when the average SNR value increases and the state of the corresponding MCS value changes from the state of "modulation scheme=BPSK, coding rate R=¾" shown in FIG. 37 to the state "modulation scheme=16 QAM, coding rate R=¾" shown in FIG. 38, the correspondence relationship between the MCS parameter and the block size slides, and changes from that shown in FIG. 37 to that shown in FIG. 38.

Feedback frame generating section 301 generates a CSI frame having the frame format as shown in FIG. 39 using each MCS value outputted from MCS deciding section 302, that is, using the MCS value corresponding to the average SNR value and the MCS value for each subcarrier block. More specifically, the MCS value corresponding to the average SNR value is used as a value expressing a reference channel state level, and the MCS value for each subcarrier block is used as a value expressing the channel state level for each subcarrier block. In FIG. 39, the MCS value corresponding to the average SNR value is arranged at the side of the top part of the CSI frame, and after the MCS value corresponding to the average SNR value, MCS values of the subcarrier blocks are arranged in ascending order of the block number.

The frame format is by no means limited to that described above. For example, it is also possible to adopt a frame format where the MCS value corresponding to the average SNR value is added to the end of the CSI frame. Further, it is also possible to adopt a frame format where the MCS values of the subcarrier blocks are arranged in descending order of the block number. An arbitrary frame format can be adopted if the frame format has an arrangement order commonly specified between transmission and reception.

Figure 40:
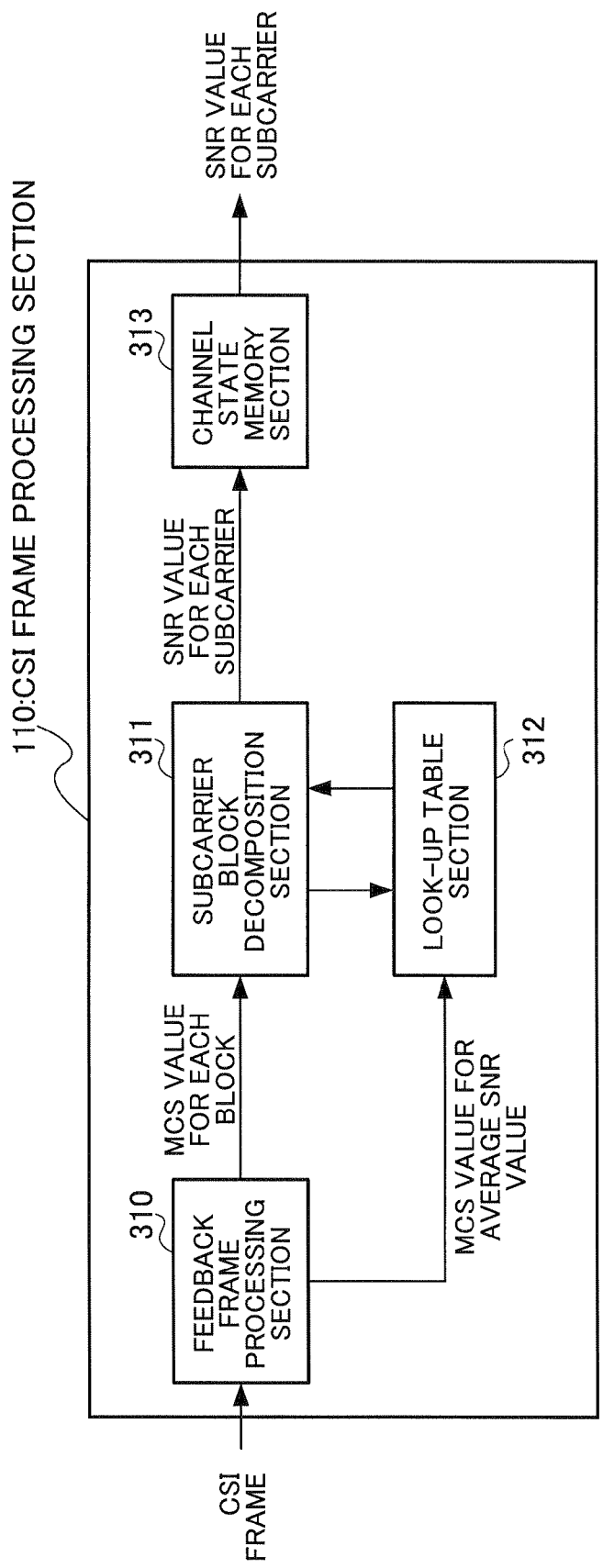
FIG. 40 is a block diagram showing a configuration of a CSI frame processing section according to Embodiment 3 of the present invention.

Next, the CSI frame processing section provided at the transmission apparatus according to this embodiment will be described using FIG. 40. The transmission apparatus of this embodiment has the same basic configuration as transmission apparatus 100 described in Embodiment 1, and the CSI frame processing section of this embodiment has the same basic configuration as CSI frame processing section 110 described in Embodiment 1. Components that are the same as or similar to those described in Embodiment 1 will be assigned the same reference numerals without further explanation.

CSI frame processing section 110 has feedback frame processing section 310, subcarrier block decomposition section 311, look-up table section 312 and channel state memory section 313.

Feedback frame processing section 310 as an extraction section extracts the MCS value corresponding to the average SNR value and the MCS value for each subcarrier block from the CSI frame transmitted from reception apparatus 150, and outputs the MCS value of the average SNR value to look-up table section 312 and the MCS value for each subcarrier block to subcarrier block decomposition section 311.

Look-up table section 312 as the holding section holds the look-up tables as shown in FIGS. 37 and 38. The correspondence relationship between the MCS value and the block size is then made to slide based on the MCS value corresponding to the average SNR value inputted from feedback frame processing section 310. For example, when the MCS value inputted from feedback frame processing section 310 is "modulation scheme=BPSK, coding rate R=¾", the look-up table setting content becomes that shown in FIG. 37. Further, for example, when the MCS value inputted from feedback frame processing section 310 is "modulation scheme=16 QAM, coding rate R=¾", the look-up table setting content becomes that shown in FIG. 38. When the MCS value of the subcarrier block is inputted from subcarrier block decomposition section 311, the block size corresponding to this MCS value is outputted to subcarrier block decomposition section 311 according to the setting of the look-up table.

Subcarrier block decomposition section 311 as a generating section acquires from the look-up table the block size corresponding to MCS value for each subcarrier block inputted from feedback frame processing section 310. The MCS value of the subcarriers included in each subcarrier block is generated by duplicating the inputted MCS value according to the block size. The generated MCS value for each subcarrier is outputted to channel state memory section 313.

Channel state memory section 313 holds the generated MCS value for each subcarrier. The held MCS value is outputted to modulation parameter deciding section 111 as CSI of each subcarrier. In this case, modulation parameter deciding section 111 uses the MCS value inputted from channel state memory section 313 in transmission control.

In this way, according to this embodiment, in a closed loop type adaptive transmission control system where the MCS parameter is decided at reception apparatus 150, and this MCS parameter is fed back to transmission apparatus 100, at transmission apparatus 100, it is possible to set the block size using the fed back MCS parameter.

As a modified example of this embodiment, it is possible to incorporate the characteristics of feedback frame processing section 210 and look-up table section 212 described in Embodiment 2 into CSI frame processing section 110 of this embodiment, and the characteristics of look-up table section 201, feedback frame generating section 202, and delay spread estimating section 203 described in Embodiment 2 into CSI frame generating section 166 of this embodiment. In this case, it is possible to implement adaptive transmission control based on delay spread described in Embodiment 2 at transmission apparatus 100 and reception apparatus 150 of this embodiment.

In the above-described embodiments, the case has been described as an example where the present invention is configured using hardware, but it is also possible to implement the present invention using software.

Further, a base station apparatus in the above-described embodiments may be expressed as Node B, a communication terminal apparatus as UE, and a subcarrier as Tone.

Furthermore, each function block used to explain the above-described embodiments is typically implemented as an LSI constituted by an integrated circuit. These may be individual chips or may partially or totally contained on a single chip.

Here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and setting of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application in biotechnology is also possible.

The present application is based on Japanese Patent Application No. 2004-272386, filed on Sep. 17, 2004, entire content of which is expressly incorporated by reference herein.

INDUSTRIAL APPLICABILITY

A transmission control frame generating apparatus and transmission control apparatus of the present invention can be applied to a base station apparatus, communication terminal apparatus and the like in a mobile communication system of a multicarrier transmission scheme.

The invention claimed is:

1. A transmission control frame generating apparatus comprising:
 a calculating section that calculates a reference channel state level between a plurality of subcarriers from a plurality of subcarrier channel state levels respectively corresponding to the plurality of subcarriers;
 a setting section that sets, based on a subcarrier channel state level corresponding to any of the plurality of subcarriers and the reference channel state level, a group channel state level of a group including said any of the plurality of subcarriers; and
 a generating section that generates a frame that is used in control of transmission with said any of the plurality of subcarriers and indicates a first value expressing the calculated reference channel state level and a second value expressing the set group channel state level, wherein:
 the setting section sets a group size of the group and the group channel state level of the group, makes the group size of the group larger when a relative size of the group channel state level of the group is larger with respect to the reference channel state level, and makes the group size of the group smaller when the relative size of the group channel state level is smaller.

2. The transmission control frame generating apparatus according to claim 1, further comprising:
a holding section that holds a table indicating a plurality of group sizes respectively corresponding to a plurality of relative sizes, and having a setting where the corresponding group size is smaller for the smaller relative size and the corresponding group size is larger for the larger relative size, wherein
the setting section sets the group size of the group and the group channel state level of the group referring to the table.

3. The transmission control frame generating apparatus according to claim 2, wherein the setting section sets the group size of the group using a group size corresponding to a relative size of the subcarrier channel state level out of the plurality of group sizes indicated in the table.

4. The transmission control frame generating apparatus according to claim 2, wherein the setting section sets the group channel state level of the group using a relative size corresponding to the set group size out of the plurality of relative sizes indicated in the table.

5. The transmission control frame generating apparatus according to claim 1, further comprising:
an acquiring section that acquires delay spread of the plurality of subcarriers, wherein:
the setting section sets the smaller group size of the group for a larger delay spread of the plurality of subcarriers, and sets the larger group size of the group for a smaller delay spread of the plurality of subcarriers; and
the generating section generates the frame indicating a third value expressing the delay spread of the plurality of subcarriers.

6. The transmission control frame generating apparatus according to claim 5, further comprising a holding section that holds a table indicating a plurality of group sizes corresponding to combinations of any of a plurality of delay spreads and any of the plurality of relative sizes, and having a first setting where the corresponding group size is smaller for the larger delay spread and the corresponding group size is larger for the smaller delay spread, and a second setting where the corresponding group size is smaller for the smaller relative size and the corresponding group size is larger for the larger relative size,
wherein the setting section sets the group size of the group and the group channel state level of the group referring to the table.

7. The transmission control frame generating apparatus according to claim 6, wherein the setting section selects group sizes corresponding to the acquired delay spread out of the plurality of group sizes indicated in the table, and sets the group size of the group using a group size corresponding to the relative size of the subcarrier channel state level out of the selected group sizes.

8. The transmission control frame generating apparatus according to claim 6, wherein the setting section sets the group channel state level of the group using the relative size corresponding to the set group size out of the plurality of relative sizes indicated in the table.

9. The transmission control frame generating apparatus according to claim 1, wherein:
the channel state level is a signal to noise power ratio;
the calculating section calculates an average signal to noise power ratio between the plurality of subcarriers;

the setting section sets a relative size of the signal to noise power ratio of the group with respect to the average signal to noise power ratio; and
the generating section generates the frame indicating the average signal to noise power ratio as the first value and indicating the relative size of the signal to noise power ratio of the group as the second value.

10. The transmission control frame generating apparatus according to claim 1, wherein:
the channel state level is a signal to noise power ratio;
the calculating section calculates an average signal to noise power ratio between the plurality of subcarriers;
the setting section sets a signal to noise power ratio of the group; and
the generating section generates the frame indicating the average signal to noise power ratio as the first value and indicating the signal to noise power ratio of the group as the second value.

11. The transmission control frame generating apparatus according to claim 1, further comprising:
a deciding section that decides a reference modulation coding scheme parameter according to the reference channel state level and decides a group modulation coding scheme parameter of the group according to the group channel state level of the group, wherein
the generating section generates the frame indicating the reference modulation coding scheme parameter as the first value and the group modulation coding scheme parameter as the second value.

12. The transmission control frame generating apparatus according to claim 1, wherein:
the group comprises a plurality of subcarriers; and
the setting section calculates an average value of a plurality of subcarrier channel state levels respectively corresponding to the plurality of subcarriers included in the group at a logarithmic value, and sets the group size of the group using the calculated average value.

13. A transmission control apparatus comprising:
an extraction section that extracts a first value and a second value respectively indicated in a frame, the first value expressing a reference channel state level between a plurality of subcarriers, and the second value expressing a group channel state level of a group including any of the plurality of subcarriers;
a generating section that generates a subcarrier channel state level of said any of the plurality of subcarriers included in the group based on the reference channel state level and the group channel state level of the group; and
a control section that controls transmission with said any of the plurality of subcarriers based on the generated subcarrier channel state level, wherein:
the generating section sets a smaller group size of the group when a relative size of the group channel state level is smaller with respect to the reference channel state level, and sets a larger group size of the group when the relative size of the group channel state level is larger.

14. The transmission control apparatus according to claim 13, further comprising:
a holding section that holds a table indicating a plurality of group sizes respectively corresponding to a plurality of relative sizes, and having a setting where the corresponding group size is smaller for the smaller relative size and the corresponding group size is larger for the larger relative size, wherein
the generating section sets the group size of the group referring to the table.

15. The transmission control apparatus according to claim 14, wherein the generating section sets the group size corresponding to the relative size of the group channel state level out of the plurality of group sizes indicated in the table as the group size of the group.

16. The transmission control apparatus according to claim 13, wherein:
the extraction section extracts a third value indicated in the frame and expressing delay spread of the plurality of subcarriers; and
the generating section sets the smaller group size of the group for the larger delay spread of the plurality of subcarriers, and sets the larger group size of the group for the smaller delay spread of the plurality of subcarriers.

17. The transmission control apparatus according to claim 16, further comprising:
a holding section that holds a table indicating a plurality of group sizes corresponding to combinations of any of a plurality of delay spreads and any of the plurality of relative sizes, and having a first setting where the corresponding group size is smaller for the larger delay spread and the corresponding group size is larger for the smaller delay spread, and a second setting where the corresponding group size is smaller for the smaller relative size and the corresponding group size is larger for the larger relative size, wherein
the setting section sets the group size of the group referring to the table.

18. The transmission control apparatus according to claim 17, wherein the setting section selects group sizes corresponding to the delay spread of the plurality of subcarriers out of the plurality of group sizes indicated in the table and sets the group size corresponding to the relative size of the group channel state level out of the selected group sizes as the group size of the group.

19. The transmission control apparatus according to claim 13, wherein:
the extraction section extracts an average signal to noise power ratio between the plurality of subcarriers, which is indicated as the first value, and extracts a relative size of a signal to noise power ratio of the group with respect to the average signal to noise power ratio, which is indicated as the second value; and
the generating section sets the group size of the group using the relative size of the signal to noise power ratio of the group.

20. The transmission control apparatus according to claim 13, wherein:
the extraction section extracts an average signal to noise power ratio between the plurality of subcarriers, which is indicated as the first value, and extracts a signal to noise power ratio of the group, which is indicated as the second value; and
the generating section sets the group size of the group using a relative size of the signal to noise power ration of the group with respect to the average signal to noise power ratio.

21. The transmission control apparatus according to claim 13, wherein:
the extraction section extracts a reference modulation coding scheme parameter between the plurality of subcarriers, which is indicated as the first value, and extracts a modulation coding scheme parameter of the group, which is indicated as the second value; and
the generating section sets the group size of the group using a relative size of the modulation coding scheme parameter of the group with respect to the reference modulation coding scheme parameter.

22. A transmission control frame generating method comprising:
a calculating step of calculating a reference channel state level between a plurality of subcarriers from a plurality of subcarrier channel state levels respectively corresponding to the plurality of subcarriers;
a setting step of setting, based on a subcarrier channel state level corresponding to any of the plurality of subcarriers and the reference channel state level, a group channel state level of a group including said any of the plurality of subcarriers; and
a generating step of generating a frame that is used in control of transmission with said any of the plurality of subcarriers and indicates a first value expressing the calculated reference channel state level and a second value expressing the set group channel state level, wherein:
the setting step sets a group size of the group and the group channel state level of the group, makes the group size of the group larger when a relative size of the group channel state level of the group is larger with respect to the reference channel state level, and makes the group size of the group smaller when the relative size of the group channel state level is smaller.

23. A transmission control method comprising:
an extraction step of extracting a first value and a second value respectively indicated in a frame, the first value expressing a reference channel state level between a plurality of subcarriers, and the second value expressing a group channel state level of a group including any of the plurality of subcarriers;
a generating step of generating a subcarrier channel state level of said any of the plurality of subcarriers included in the group based on the reference channel state level and the group channel state level of the group; and
a control step of controlling transmission with said any of the plurality of subcarriers based on the generated subcarrier channel state level, wherein:
the generating step sets a smaller group size of the group when a relative size of the group channel state level is smaller with respect to the reference channel state level, and sets a larger group size of the group when the relative size of the group channel state level is larger.

* * * * *